(12) United States Patent
Budny et al.

(10) Patent No.: US 7,909,557 B2
(45) Date of Patent: Mar. 22, 2011

(54) ARRANGEMENT FOR THE FILLING AND/OR EMPTYING OF CONTAINERS FILLED AND/OR FOR FILLING WITH ARTICLES AND MANIPULATION DEVICE FOR TRANSPORTING THE CONTAINERS

(75) Inventors: Piotr Budny, Hamburg (DE); Peter Kägeler, Geesthacht (DE)

(73) Assignee: Hauni Maschinenbau Ag, Hamburg (DE)

( * ) Notice: Subject to any disclaimer, the term of this patent is extended or adjusted under 35 U.S.C. 154(b) by 941 days.

(21) Appl. No.: 10/580,031

(22) PCT Filed: Oct. 28, 2004

(86) PCT No.: PCT/EP2004/012350
§ 371 (c)(1),
(2), (4) Date: May 19, 2006

(87) PCT Pub. No.: WO2005/058077
PCT Pub. Date: Jun. 30, 2005

(65) Prior Publication Data
US 2007/0110546 A1    May 17, 2007

(30) Foreign Application Priority Data
Nov. 25, 2003 (DE) .................................. 103 55 876

(51) Int. Cl.
*B65H 1/00* (2006.01)
(52) U.S. Cl. .............................. 414/222.02; 414/331.18
(58) Field of Classification Search .................. 414/411, 414/286, 416.03, 416.08, 416.09, 222.02, 414/331.18
See application file for complete search history.

(56) References Cited

U.S. PATENT DOCUMENTS

| | | | |
|---|---|---|---|
| 3,912,061 A * | 10/1975 | Foster, Jr. ...................... | 192/133 |
| 4,772,170 A | 9/1988 | Oldfield | |
| 4,789,295 A * | 12/1988 | Boucher et al. ............... | 414/497 |
| 4,827,691 A * | 5/1989 | Hanada et al. ................. | 53/151 |
| 4,892,453 A | 1/1990 | Bantien et al. | |
| 5,123,798 A | 6/1992 | Glösmann et al. | |
| 6,168,366 B1 * | 1/2001 | Horn ....................... | 414/416.03 |

(Continued)

FOREIGN PATENT DOCUMENTS

DE    16 32 196 A1    5/1970
(Continued)

OTHER PUBLICATIONS

UNI EN 775 1994, "Manipulating industrial robots— Safety."
(Continued)

*Primary Examiner* — Charles A Fox
(74) *Attorney, Agent, or Firm* — Venable LLP; Robert Kinberg; Steven J. Schwarz

(57) ABSTRACT

The invention concerns an arrangement for filling and/or emptying receptacles filled and/or to be filled with articles, essentially including at least one handling device for transporting receptacles that have been and/or are to be filled between a reservoir and a device which alters the level of the receptacles, at least one device which alters the level of the receptacles, and at least one reservoir for holding receptacles that have been and/or are to be filled, which is distinguished in that the arrangement is designed as a closed unit, such that the handling device is surrounded in cell fashion by the at least one device altering the level of the receptacles and by the at least one reservoir.

21 Claims, 23 Drawing Sheets

U.S. PATENT DOCUMENTS

Figure 1:
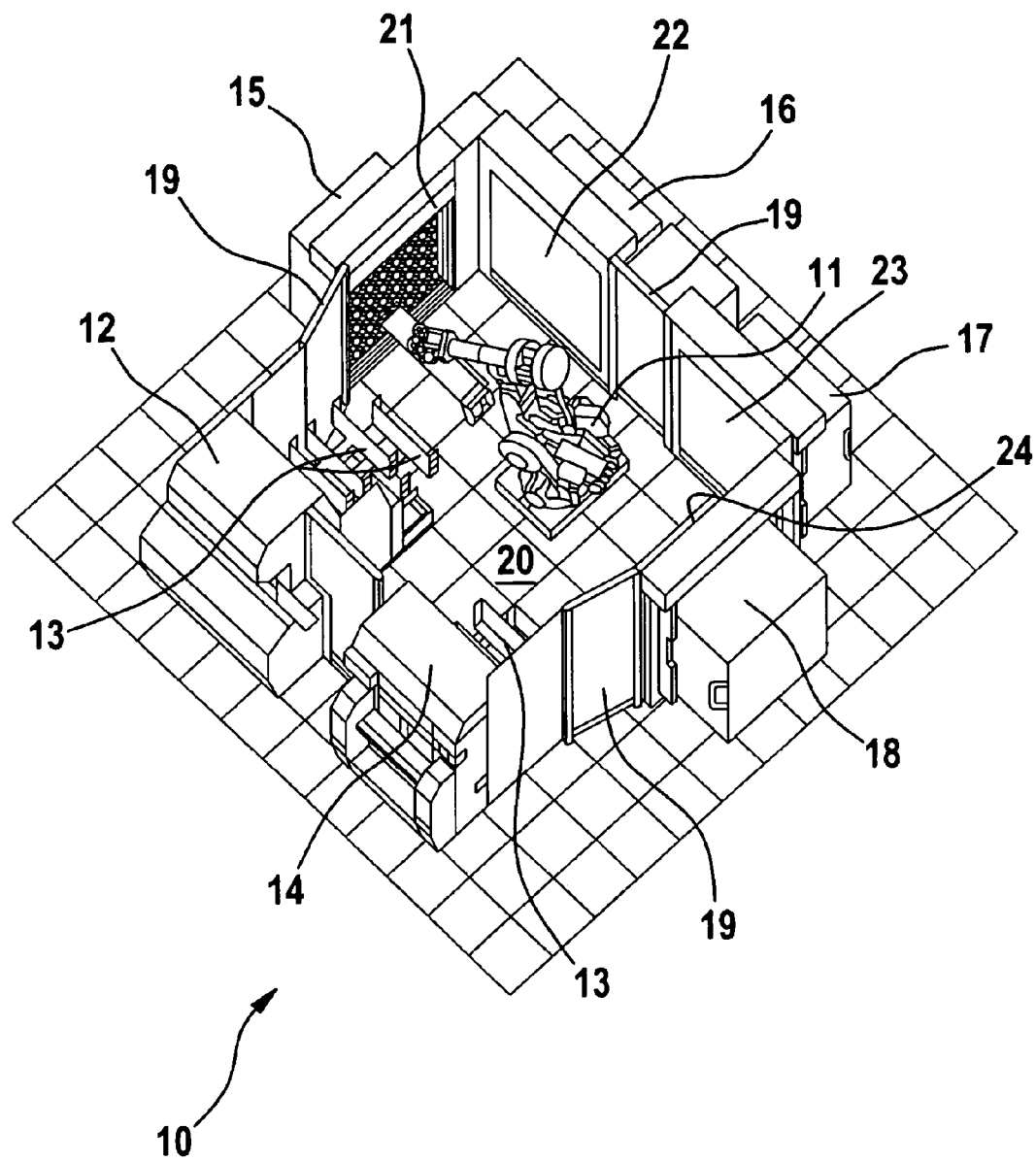

| | | | |
|---|---|---|---|
| 6,290,448 B1 | 9/2001 | Focke et al. | |
| 6,419,438 B1 * | 7/2002 | Rosenquist | 414/217 |
| 6,478,137 B2 * | 11/2002 | Hebels et al. | 198/347.1 |
| 6,479,786 B1 * | 11/2002 | Fields et al. | 219/121.63 |
| 6,585,470 B2 * | 7/2003 | Van Der Meulen | 414/217 |
| 6,892,890 B2 * | 5/2005 | Dominguez | 209/559 |
| 6,986,632 B2 * | 1/2006 | Spatafora et al. | 414/421 |
| 7,322,083 B2 * | 1/2008 | Parmenter et al. | 29/33 P |
| 2001/0046436 A1 | 11/2001 | Mahoney | |
| 2008/0021597 A1 * | 1/2008 | Merte et al. | 700/255 |

FOREIGN PATENT DOCUMENTS

| | | |
|---|---|---|
| DE | 35 32 305 A1 | 3/1987 |
| DE | 39 17 097 A1 | 11/1990 |
| DE | 42 17 079 A1 | 11/1992 |
| DE | 200 03 638 U1 | 2/2000 |
| DE | 100 21 055 A1 | 12/2000 |
| DE | 201 01 442 U1 | 5/2001 |
| DE | 199 59 285 A1 | 6/2001 |
| EP | 143 897 A1 | 6/1985 |
| EP | 0 361 178 A1 | 4/1990 |
| EP | 0 363 722 A2 | 4/1990 |
| EP | 1 106 086 A | 6/2001 |
| EP | 1 308 101 A1 | 5/2003 |
| EP | 1 375 088 A1 | 1/2004 |
| FR | 2 553 864 A1 | 4/1985 |
| FR | 2 660 005 A1 | 9/1991 |
| JP | 61-206709 | 9/1986 |
| JP | 04-182204 | 6/1992 |
| JP | 08-268512 | 10/1996 |
| JP | 2003-072916 | 3/2003 |
| JP | 2003-193777 | 7/2003 |

OTHER PUBLICATIONS

Examination Report dated Nov. 11, 2008 issued in EP04820389.7.
Official Action of Japanese Application No. 2006-540223 mailed on May 12, 2009.
Office Action of Chinese Application No. 200480034457.9 issued May 8, 2009.
Third Party Observation Under Rule 114(2) EPC dated Dec. 28, 2010 from related European Application No. 09075225.4-2308.
Examination Report dated Jan. 19, 2011 from related European Application No. 09075225.4-2308.

* cited by examiner

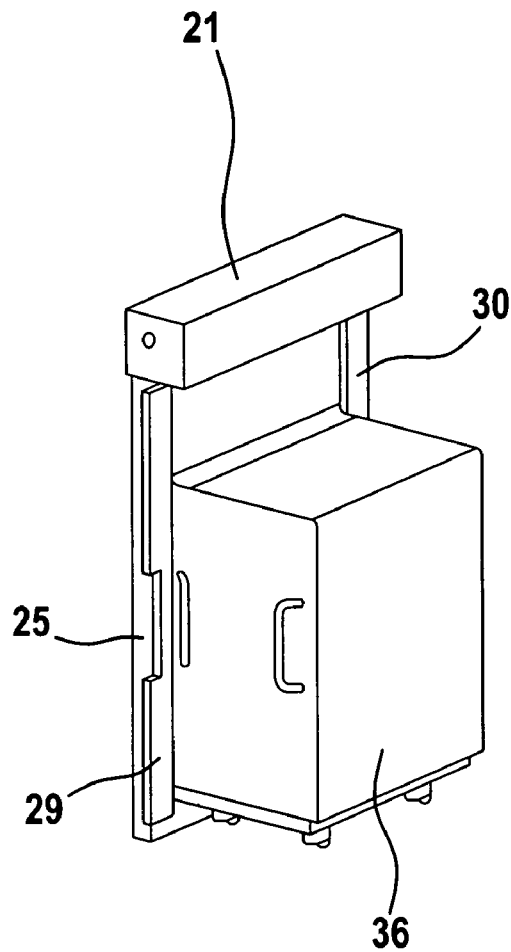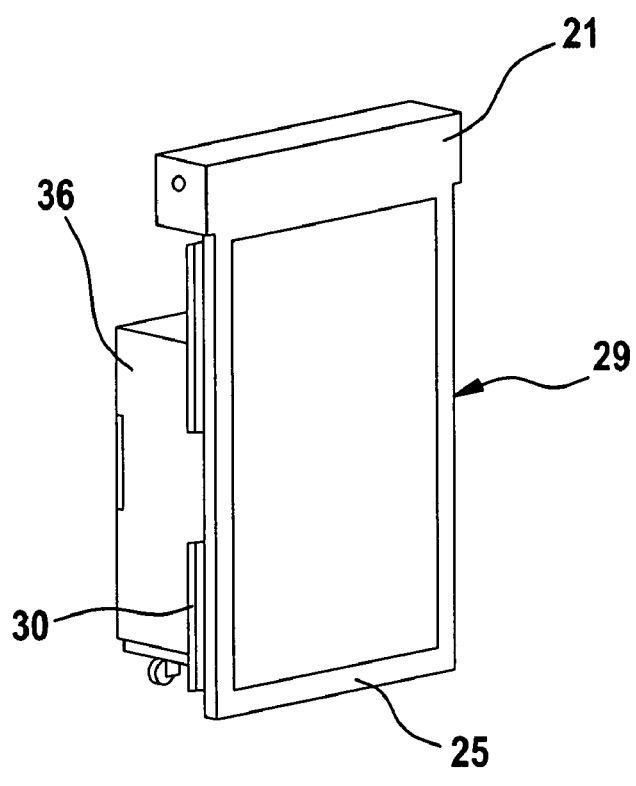
Fig. 6a                    Fig. 6b

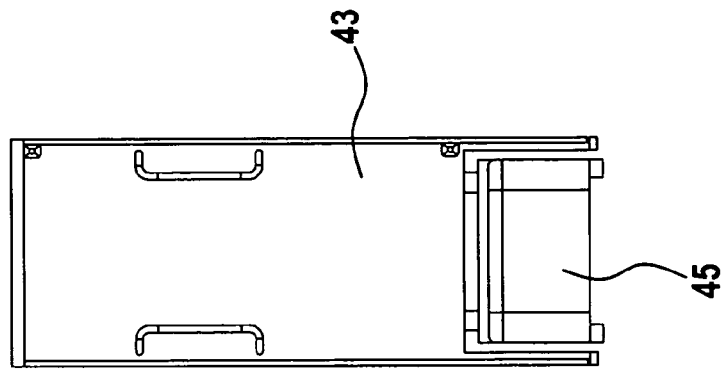
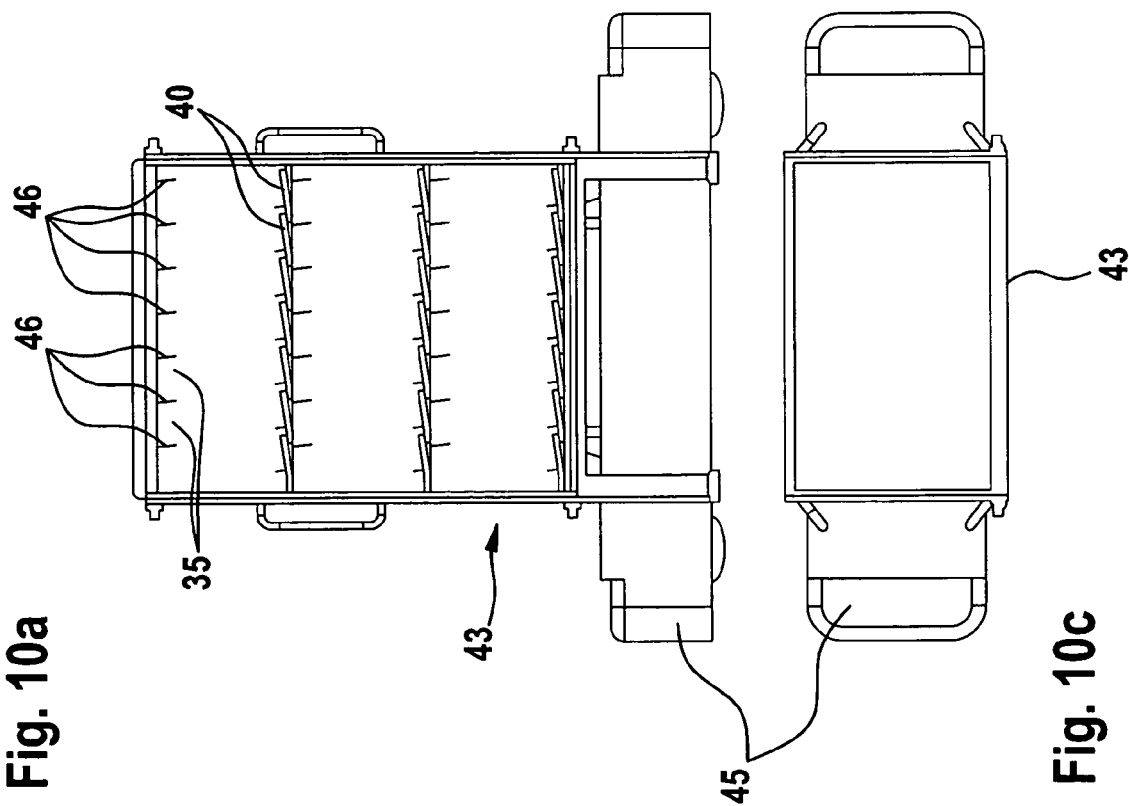
Fig. 10b
Fig. 10a
Fig. 10c

ARRANGEMENT FOR THE FILLING AND/OR EMPTYING OF CONTAINERS FILLED AND/OR FOR FILLING WITH ARTICLES AND MANIPULATION DEVICE FOR TRANSPORTING THE CONTAINERS

CROSS REFERENCE TO RELATED APPLICATIONS

This application is a National Stage Application of PCT/EP2004/012350, filed Oct. 28, 2004, which designates the United States and claims the priority of German Patent Application No. DE 103 55 876.4, filed on Nov. 25, 2003.

The invention concerns an arrangement for filling and/or emptying receptacles filled and/or to be filled with articles, essentially including at least one handling device for transporting receptacles that have been and/or are to be filled between a reservoir and a device which alters the fill level of the receptacles, at least one device which alters the fill level of the receptacles, and at least one reservoir for holding receptacles that have been and/or are to be filled. Furthermore, the invention concerns a handling device, in particular as a component of the above-mentioned arrangement, essentially including a handling arm which is designed to be movable in several degrees of freedom, a gripping element which is arranged movably at the free end of the handling arm, and at least one linear guide with a carrying element movable on the linear guide as well as a holding element for the receptacles, and a drive for moving the carrying element.

Arrangements and handling devices of this kind are used in particular in the tobacco-processing industry. Frequently, for different reasons articles have to be discharged from processing and reintroduced into processing at a later time. For example, there is a need to harden filters before connection to a tobacco rod or the like. In another example, a surplus of cigarettes must be stored temporarily. For this purpose, the filters, cigarettes or other articles are introduced into receptacles, so-called trays, at a filling station and transported with the handling device into a reservoir. In the event that the articles buffered in the trays are to be reintroduced into processing, the trays must be removed from the reservoirs and fed to a discharge station.

With known arrangements, the reservoirs are arranged in the region of the devices that alter the fill level of the receptacles, the arrangement being designed in an open manner such that the handling device is accessible even during operation. The reservoirs and the devices for altering the fill level of the receptacles are also arranged in such a way that a complex cycle of movement of the handling device with long transport distances is required. The known handling devices for transfer of the receptacles can each be used for specially adapted receptacles.

The known arrangements have the disadvantage that, firstly, considerable travelling distances are required for transfer of the receptacles from the reservoir to the device which alters the fill level of the receptacles and back, which reduces the output, namely in particular the throughput of articles to be transported. Furthermore, the open arrangement entails a considerable safety risk for the operator. The known handling devices for transfer of the receptacles have the disadvantage that they can be used only to a limited extent or are structurally very elaborate in order to be capable of being adapted to different receptacle shapes and sizes.

It is therefore the object of the present invention to provide a compact and universally usable arrangement which is easy to handle and safe. Furthermore, it is the object of the invention to provide a handling device which is easy to handle and universally usable.

This object is achieved firstly by an arrangement of the kind mentioned hereinbefore by the fact that the arrangement is designed as a closed unit, such that the handling device is surrounded in cell fashion by the at least one device altering the fill level of the receptacles and by the at least one reservoir. By forming a closed cell, a very compact and at the same time safe arrangement is provided, which ensures transfer of the receptacles with very short transport distances. As a result, the receptacle-changing times are reduced.

Advantageously, the reservoirs are closable on their inwardly directed side facing towards the handling device, this being achieved by the fact that each reservoir is associated with a tray bay element which can optionally be opened or closed. Due to this construction, changing of the reservoirs during operation of the arrangement is ensured. A reservoir is thus disconnected or separated from the actual cell, so that accidental access of the handling device is prevented.

Preferably, the handling device is designed universally in such a way that receptacles can be gripped at a smooth partial surface on the side facing out of the open reservoir. This allows flexible use of the arrangement essentially not tied to the shape and design of the receptacles.

Furthermore, the object is achieved by a handling device with the features of the kind mentioned hereinbefore, by the fact that the gripping element is designed in such a way that receptacles can be gripped at smooth partial surfaces on the side facing out of a reservoir. Thus flexible use of the handling device is ensured, this being substantially independently of the design and shape of ordinary receptacles.

Preferably, the gripping element on the side facing towards the receptacles has elements for pushing and/or sliding the receptacles. As a result, additional gripping and/or fastening elements can be dispensed with, so that the structure of the handling device is simplified. Also, this design enables universal use in a particularly simply manner.

In a preferred embodiment of the invention, the gripping element has at least one, preferably two suction cups, in particular for pulling the receptacles, and at least one, preferably two buffer elements, in particular for pushing the receptacles. With the suction cups and the buffer elements, for transport the receptacles must meet only minimal requirements, namely a small contact surface which every conventional receptacle has, so that all conventional receptacle shapes can be transported with the handling device, this being without additional constructive expenditure.

Figure 2:
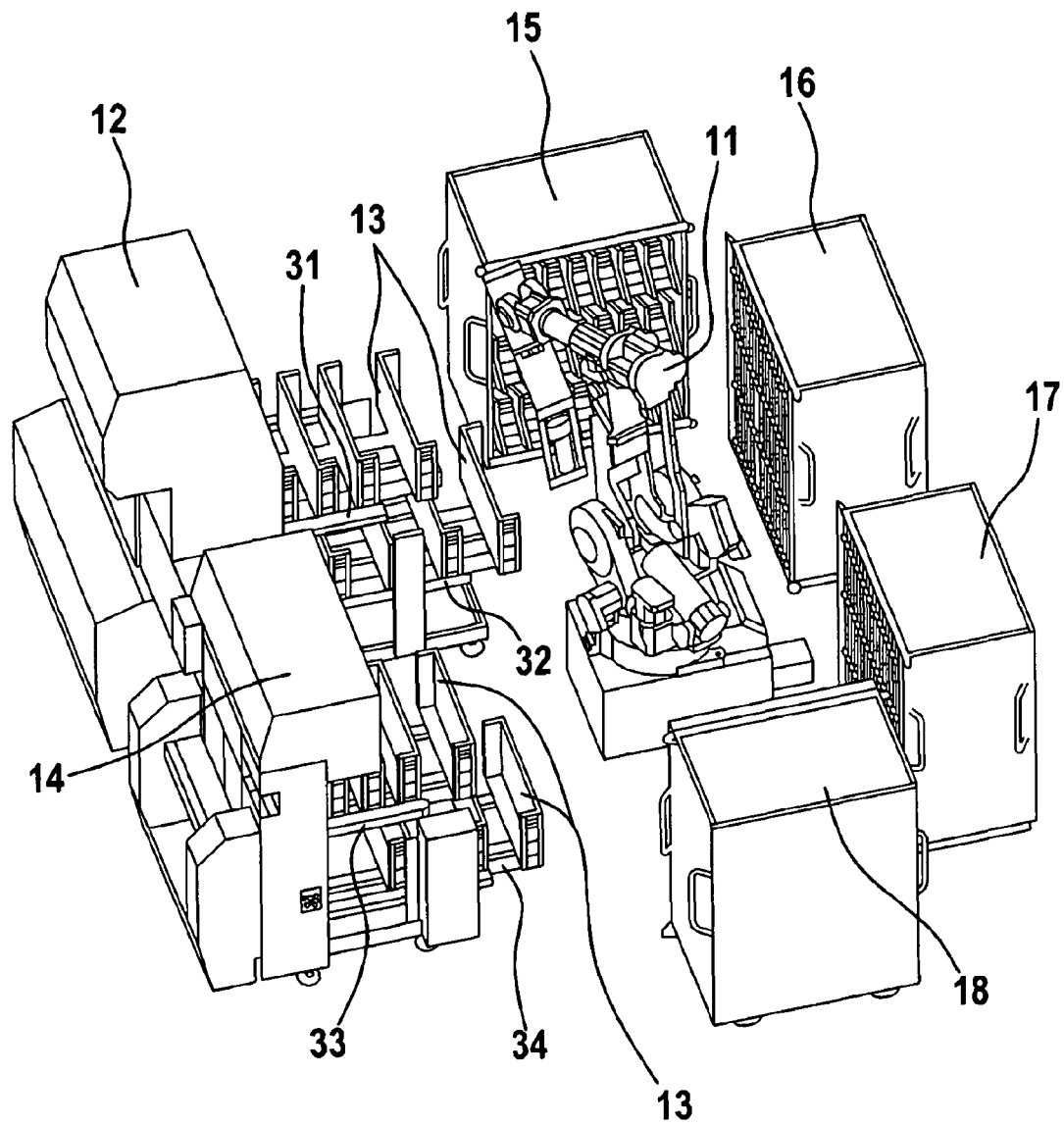
Figure 3:
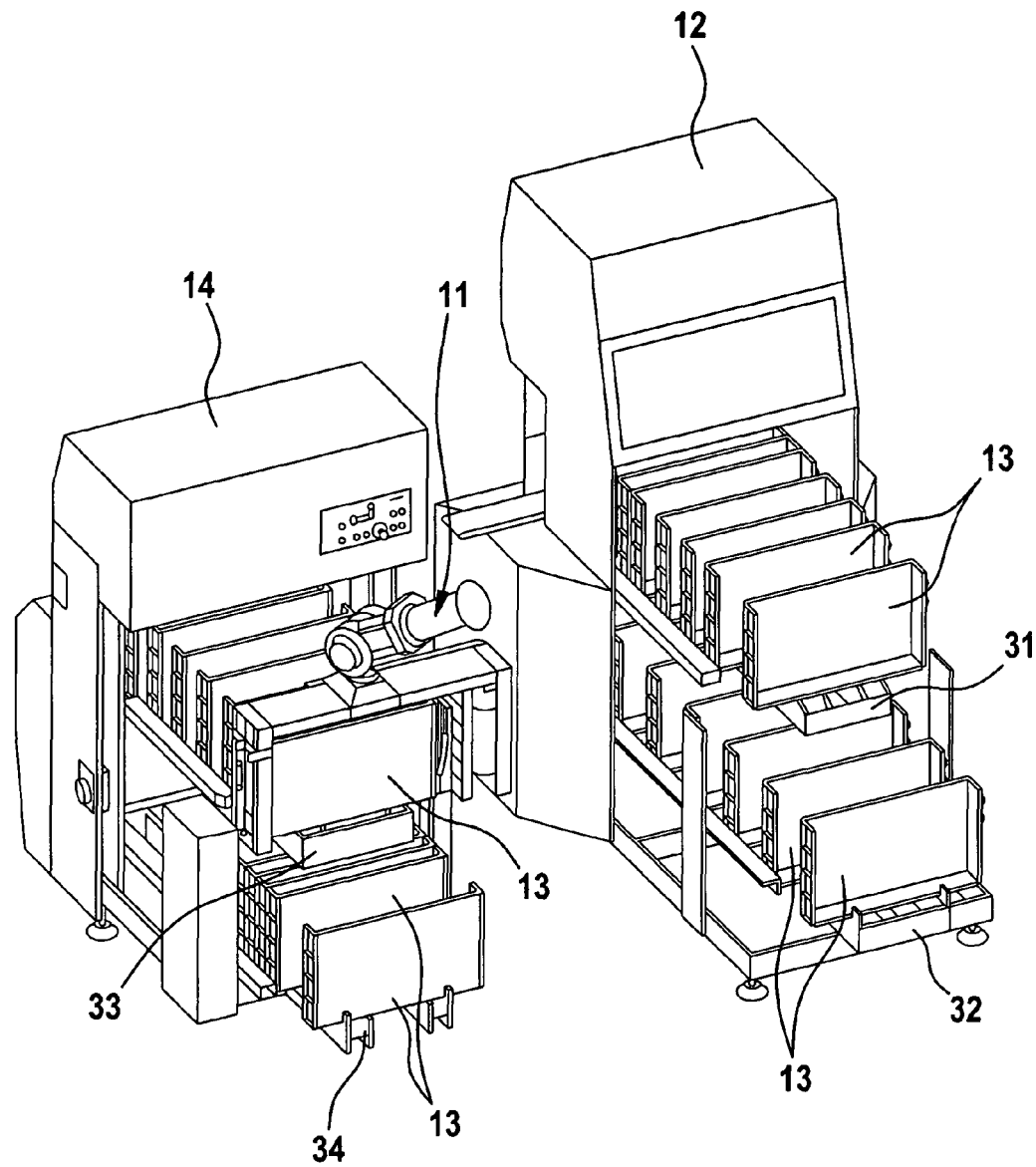
Figure 4:
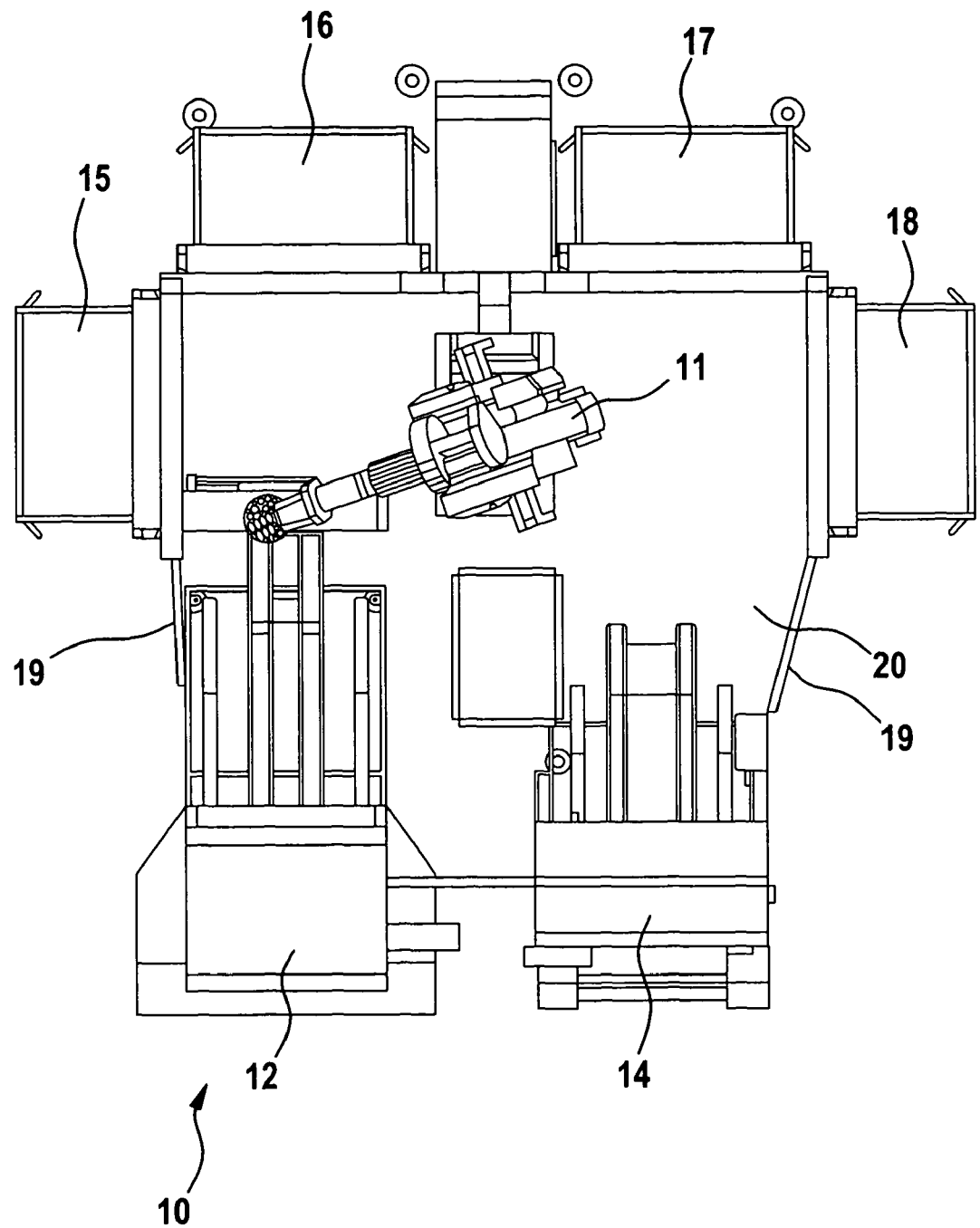
Figure 5A:
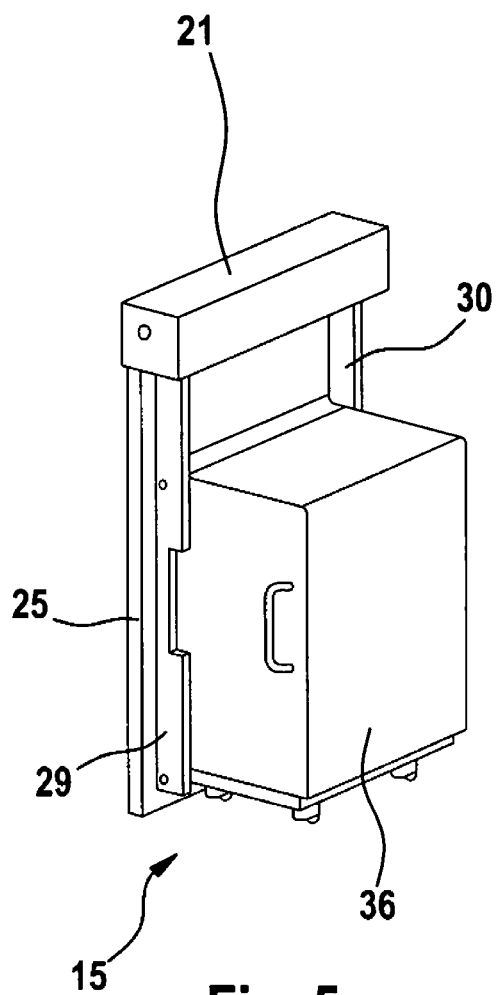
Figure 7:
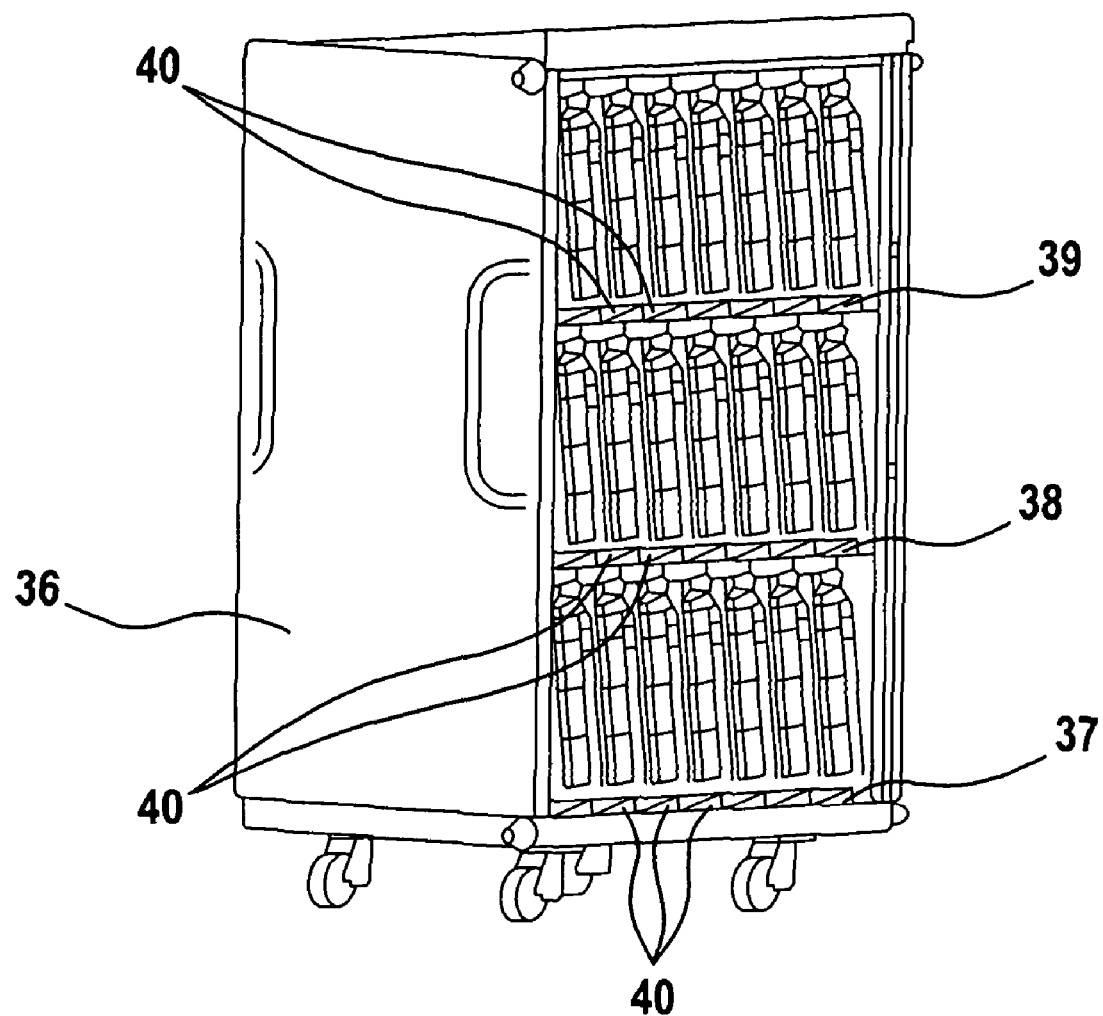
Figure 8:
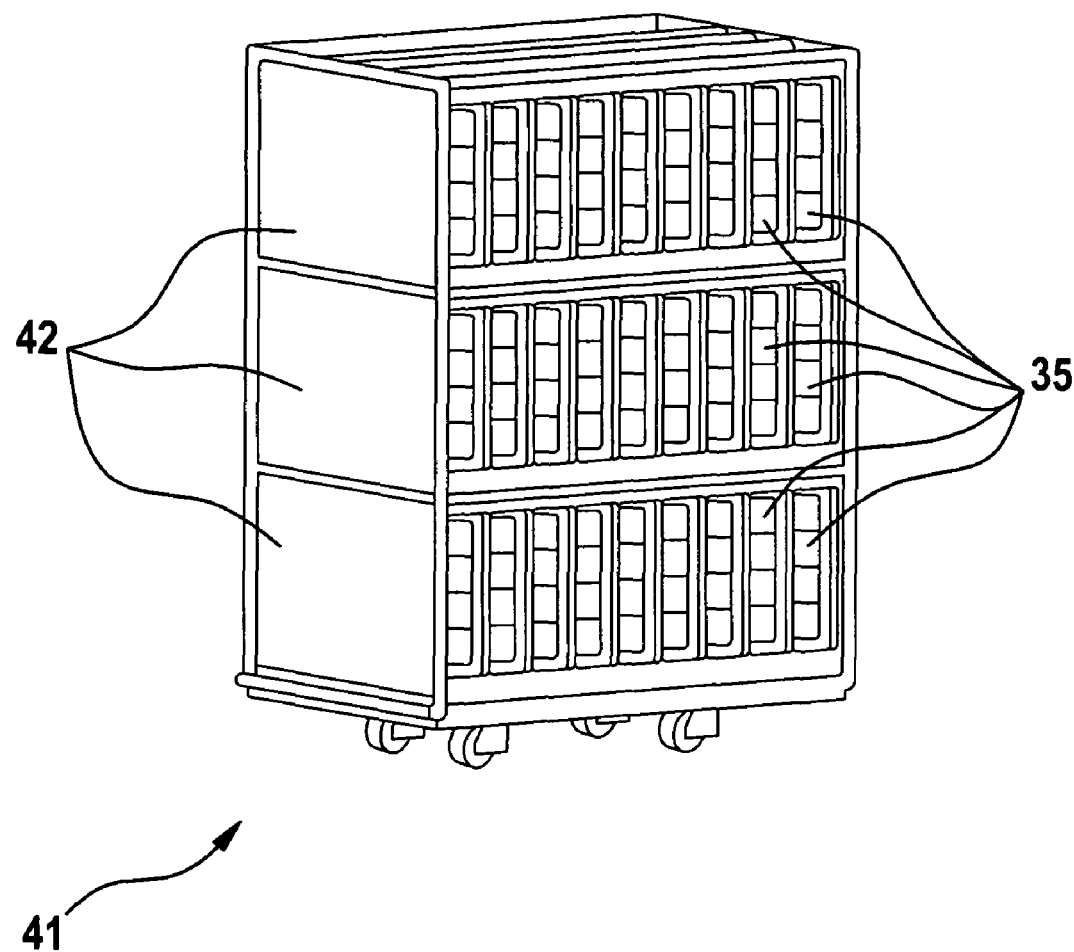
Figure 9B:
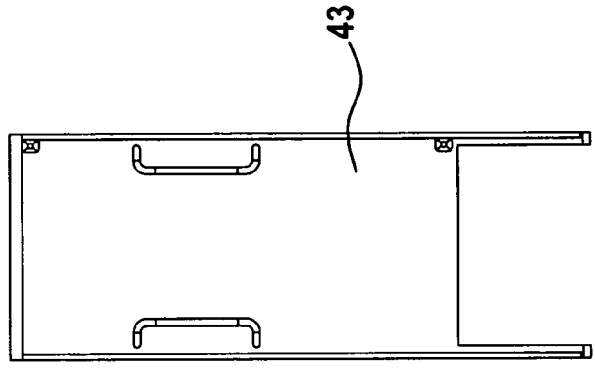
Figure 9A:
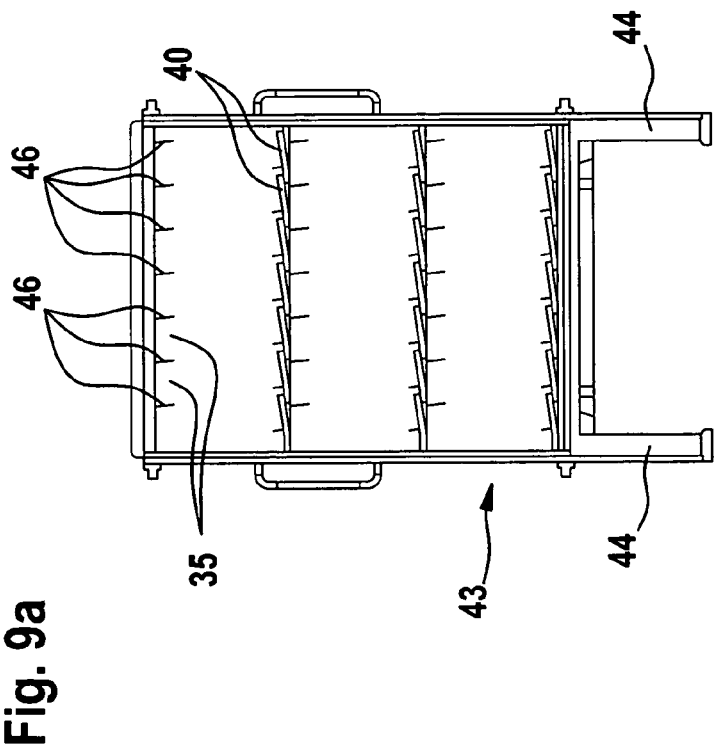
Figure 9C:
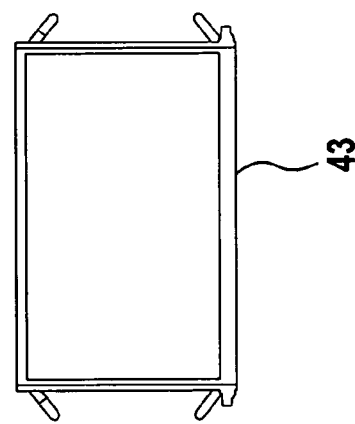
Figure 11:
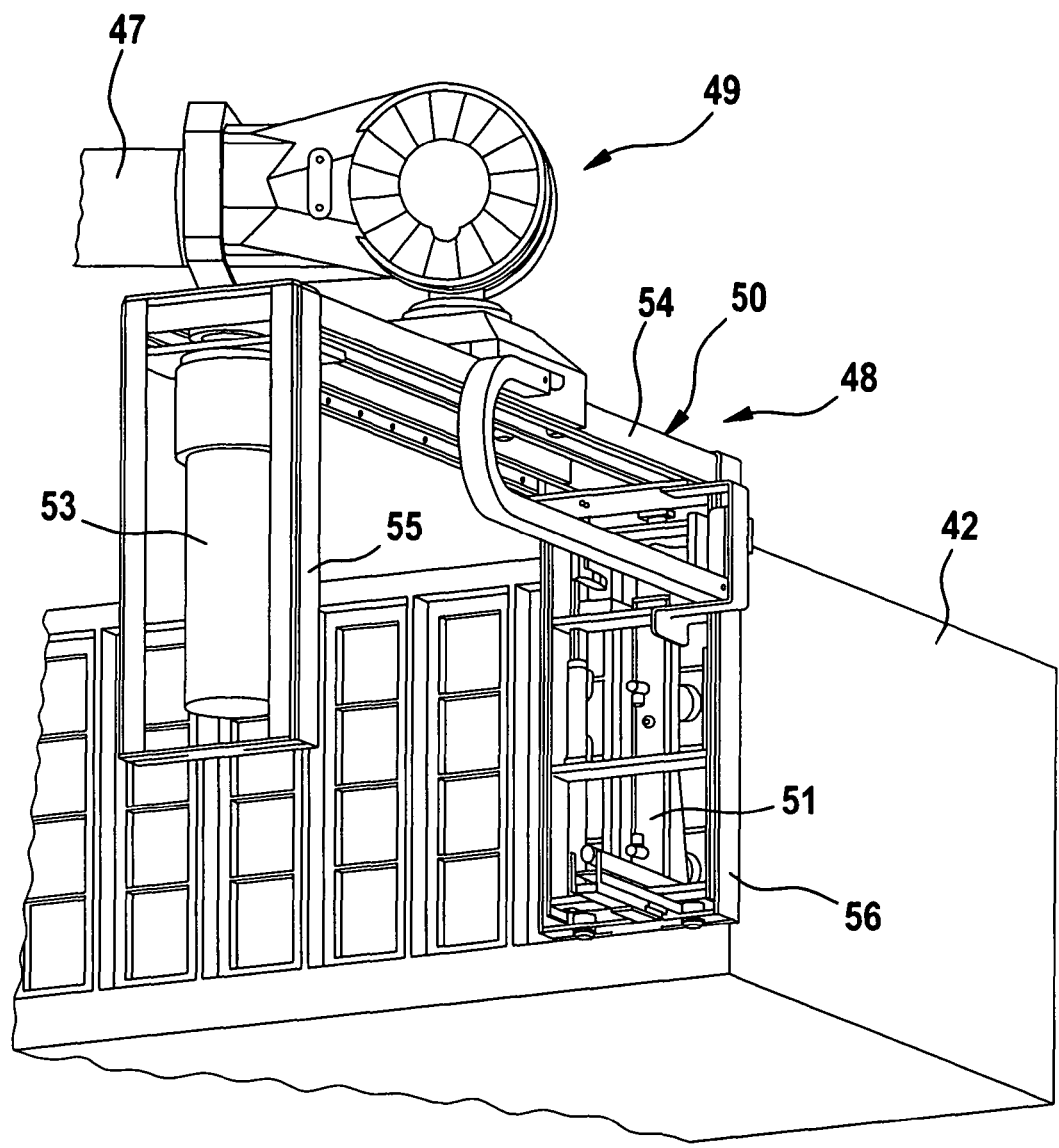
Figures 12A, 12B:
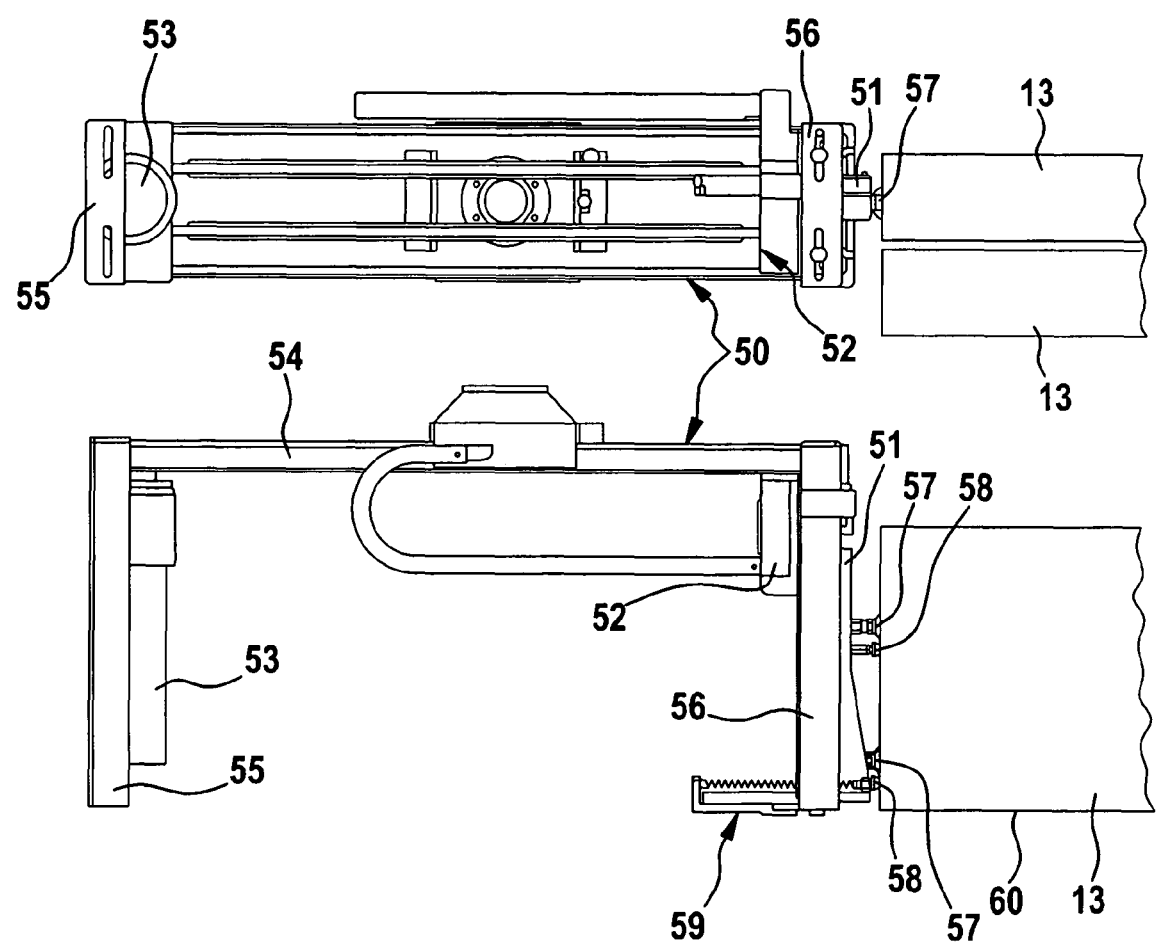
Figure 13A:
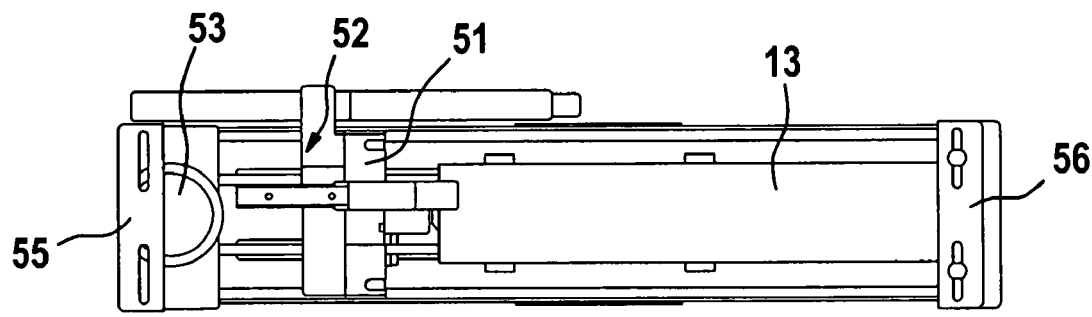
Figure 14:
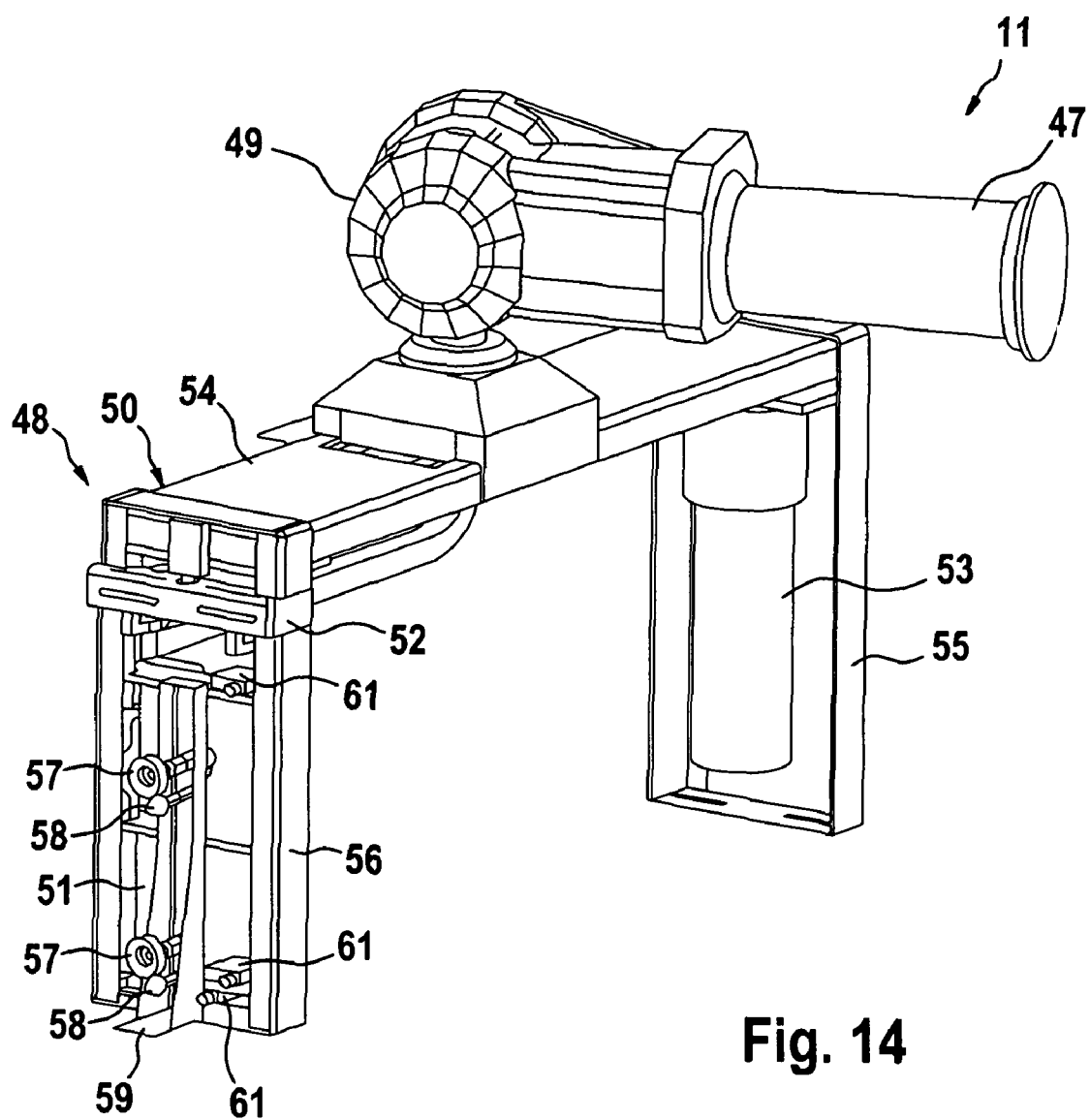
Figure 15:
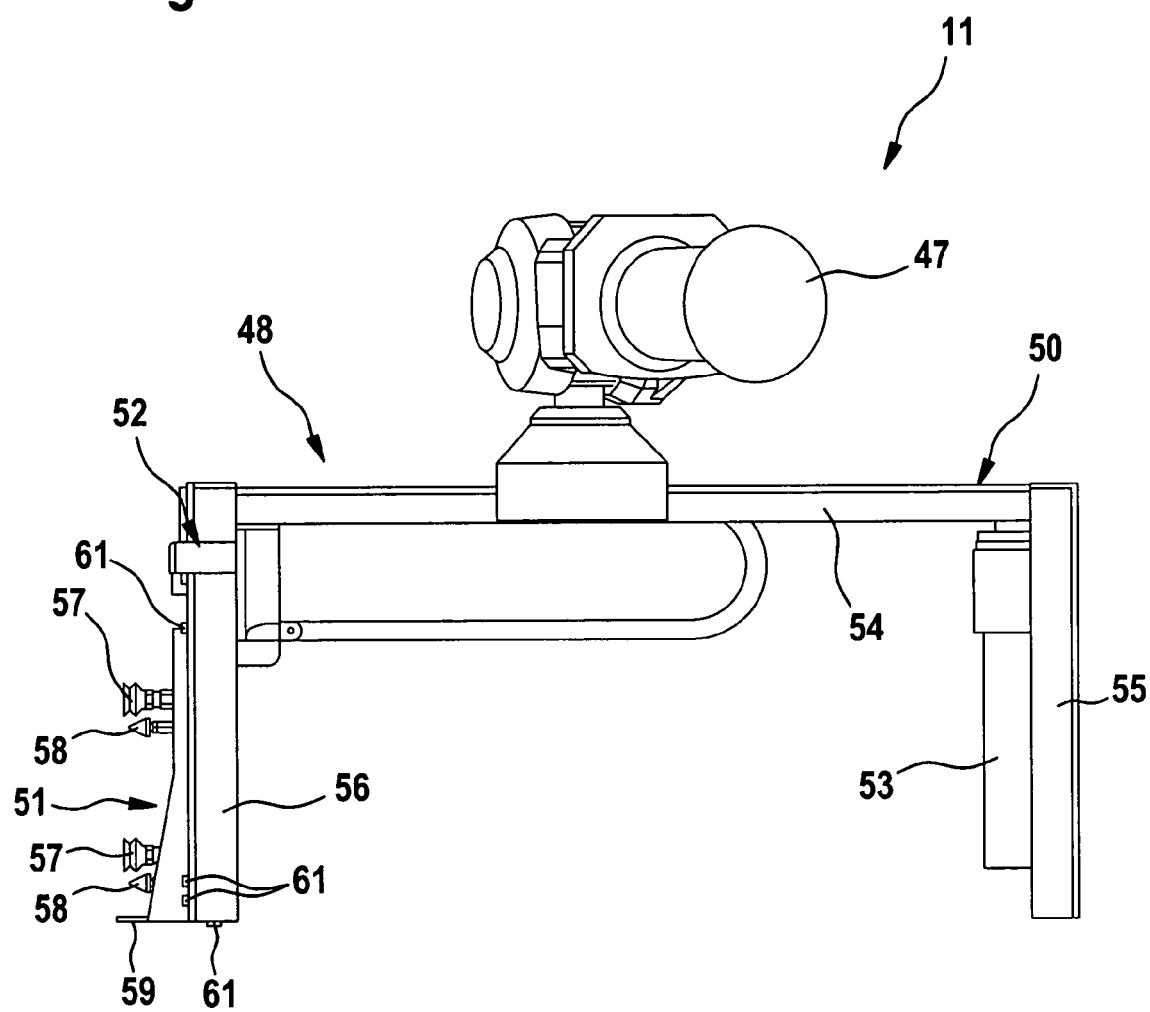
Figure 16:
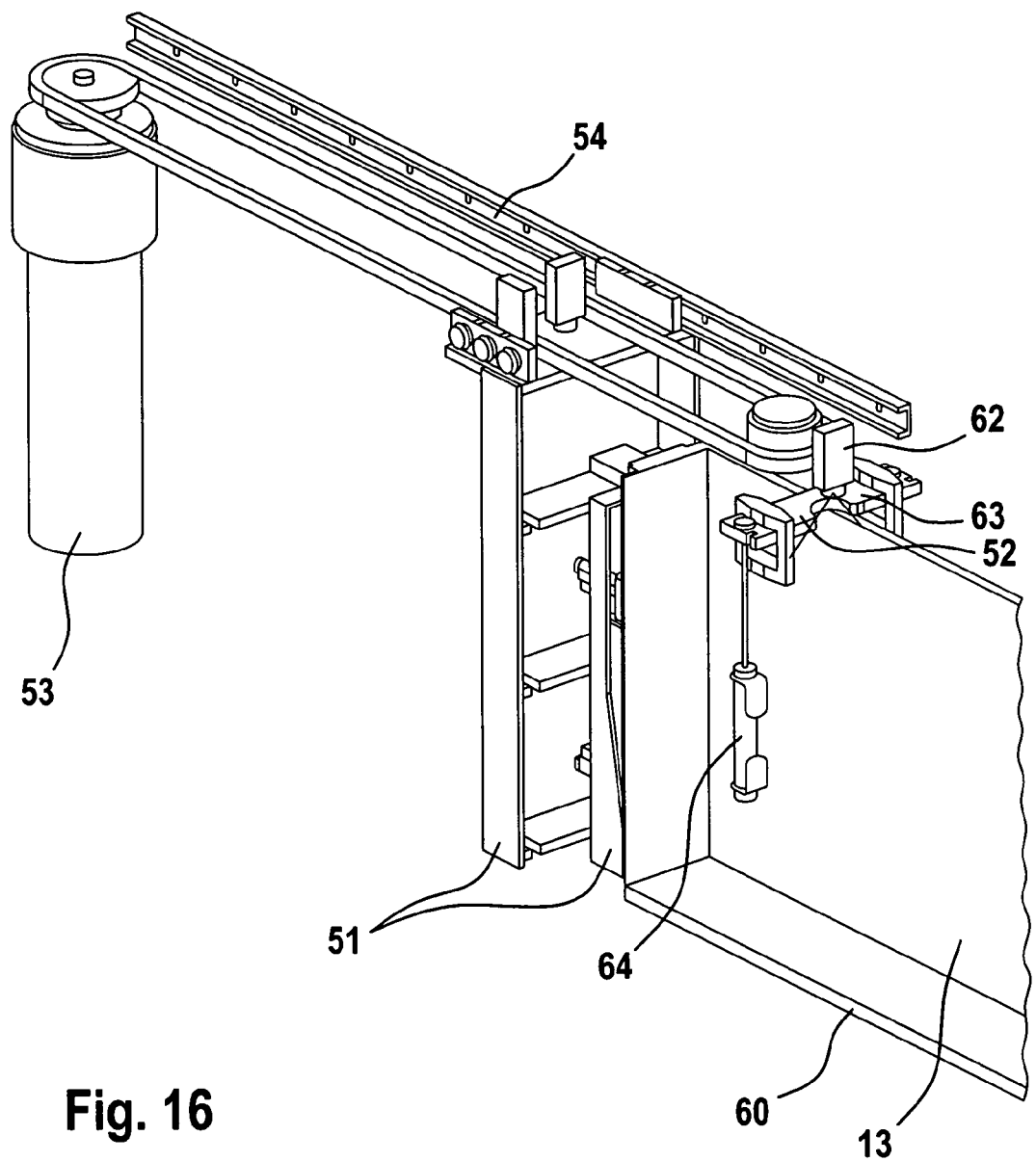
Figure 17:
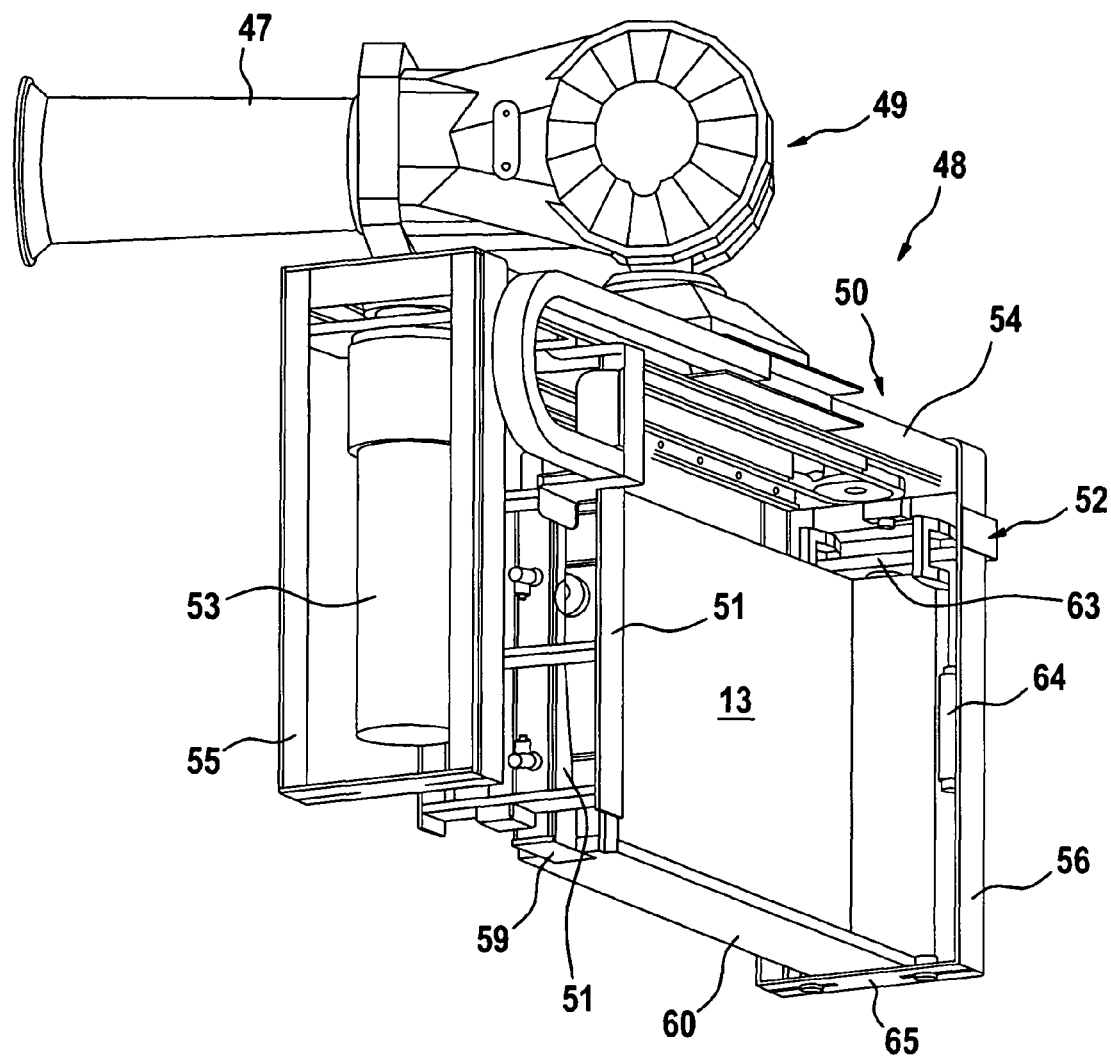
Figure 18:
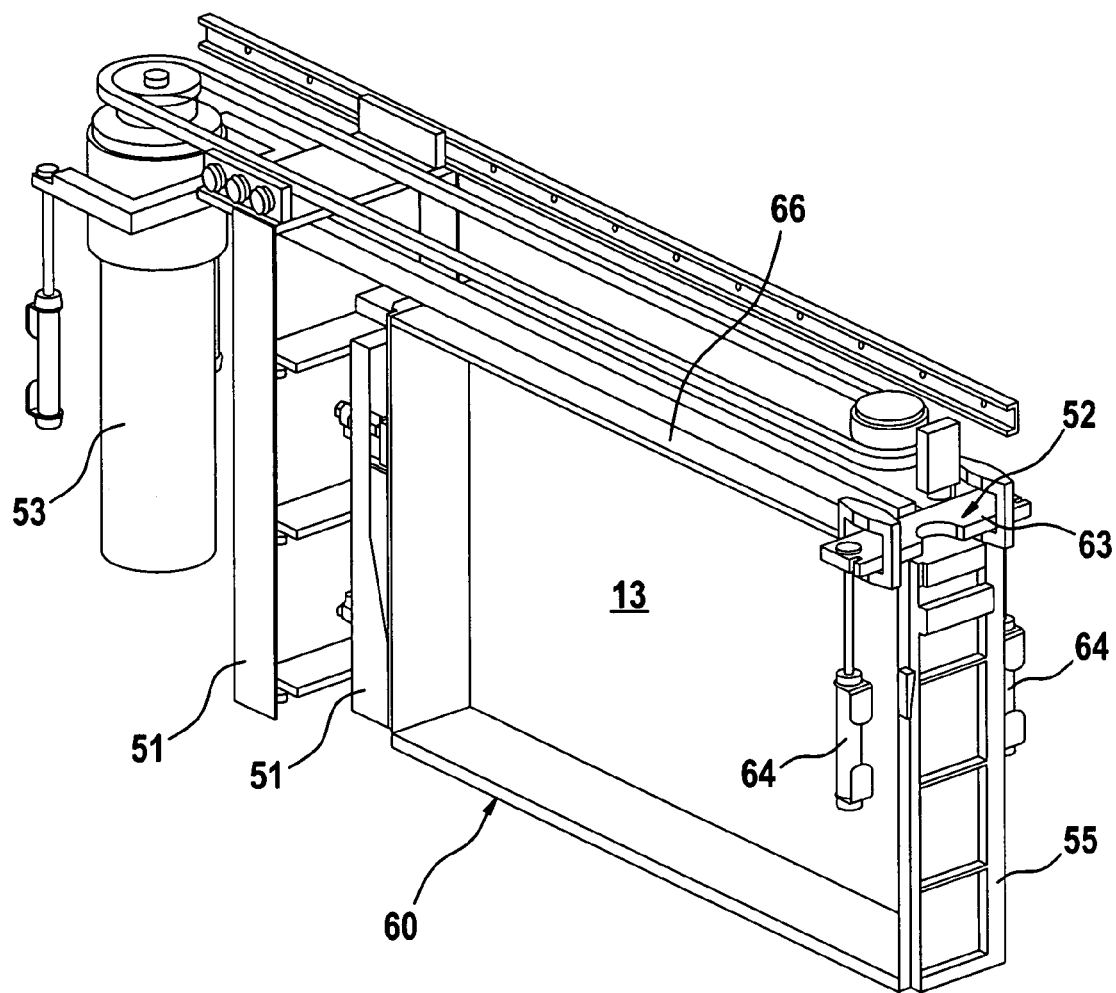
Figure 19:
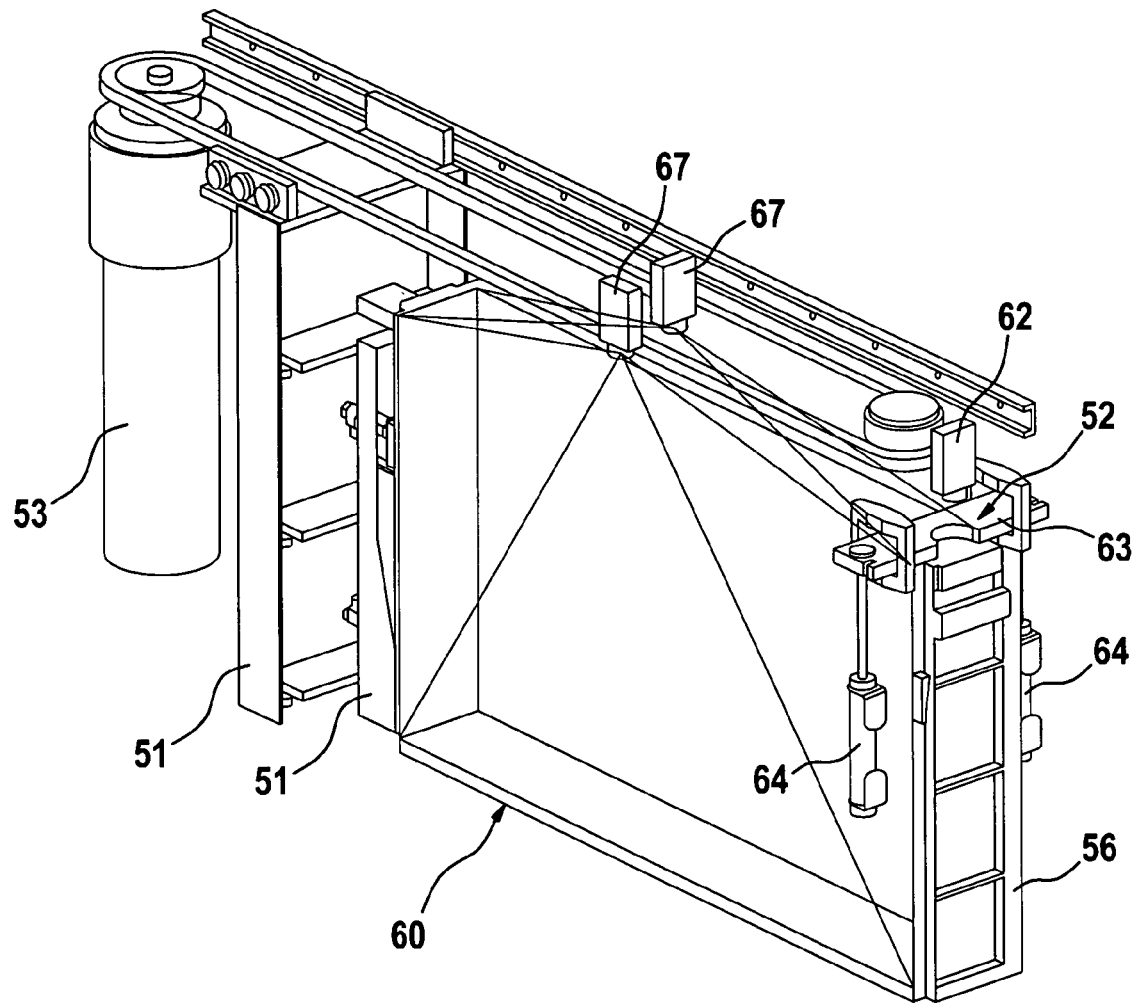
Figure 20:
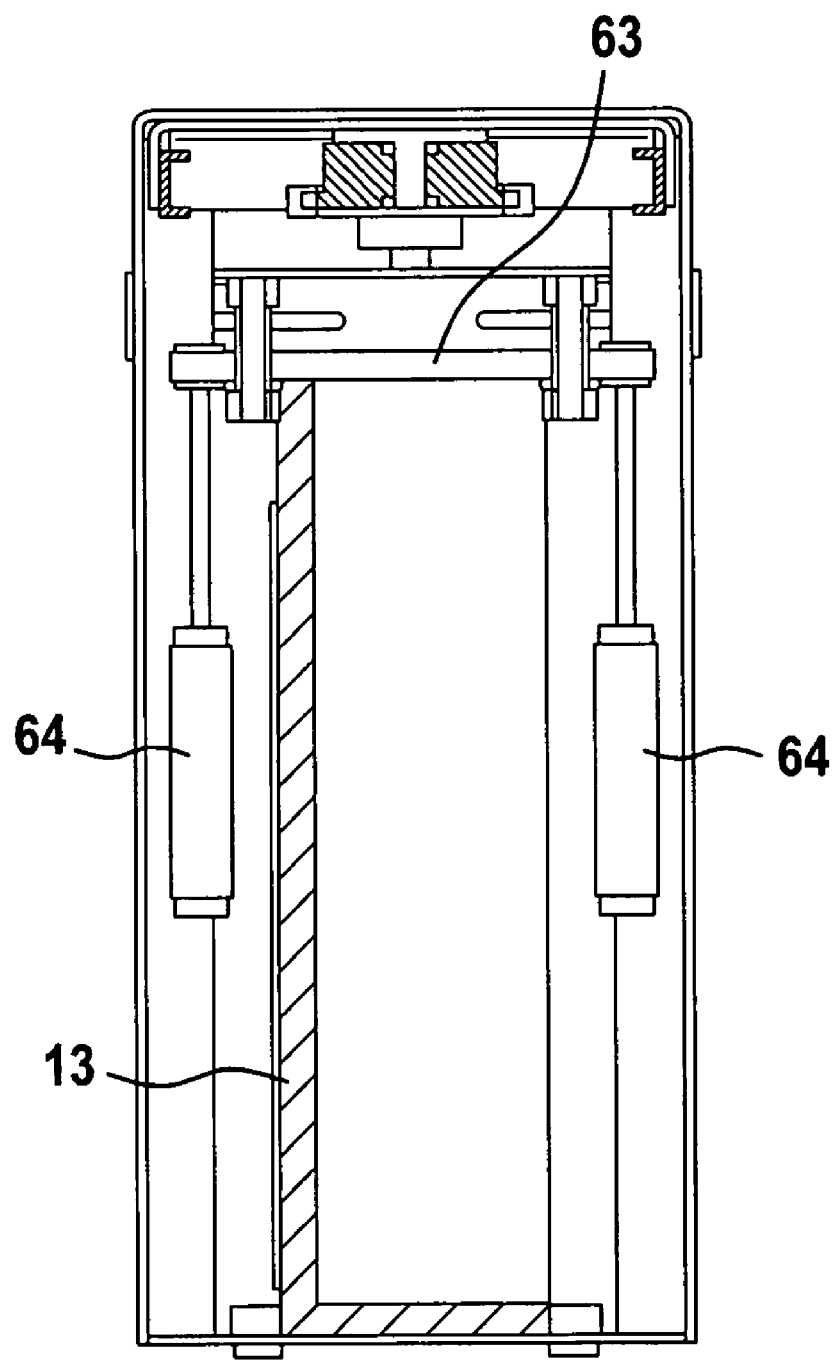
Figure 21:
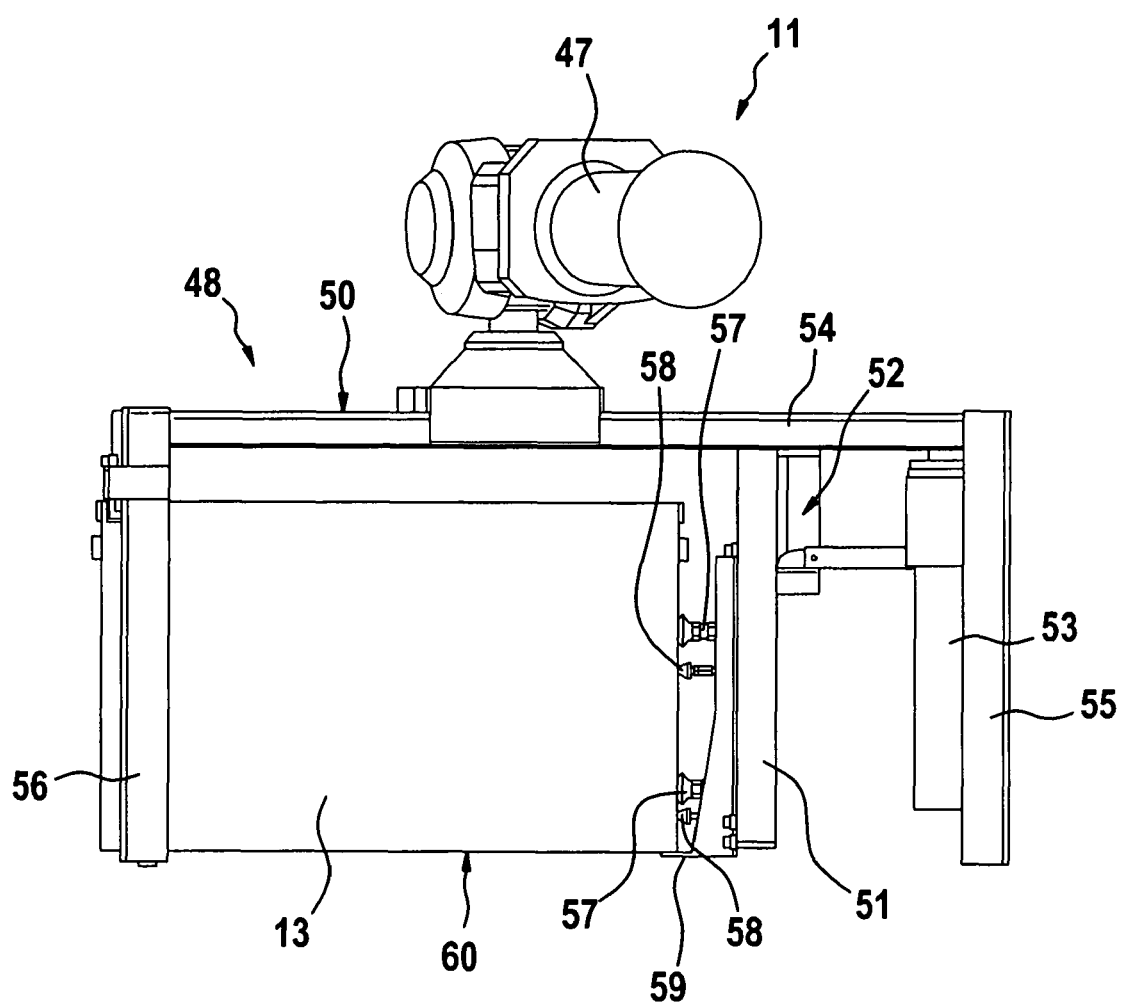
Figure 22:
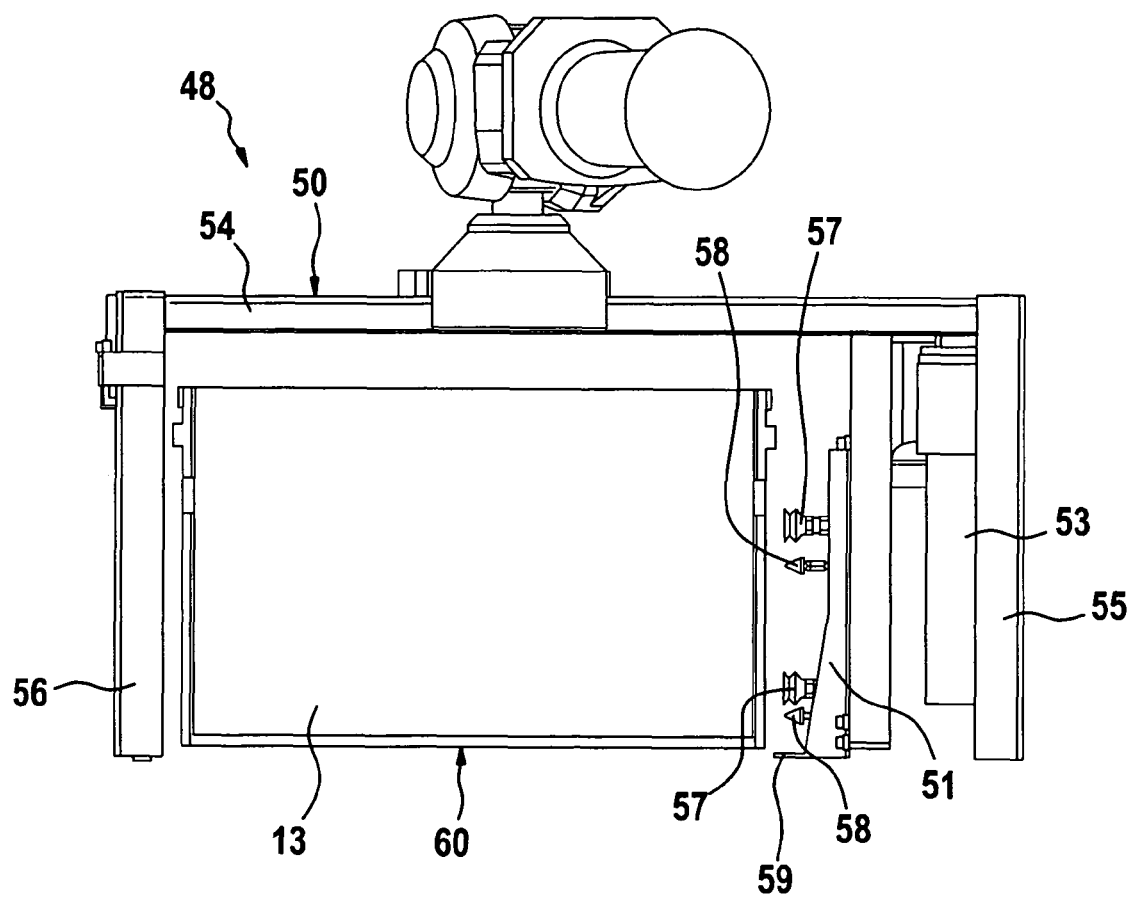
Figure 23A:
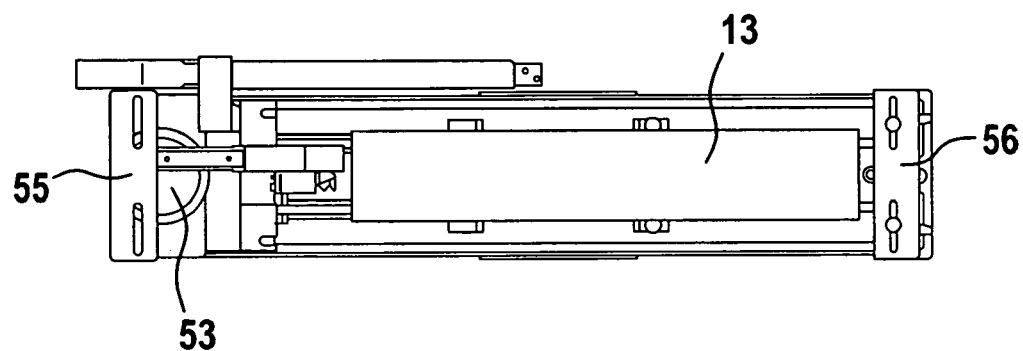

Further advantageous and preferred characteristics and embodiments of the invention are apparent from the subsidiary claims and the description. Particularly preferred embodiments are described in more detail with the aid of the attached drawings. The drawings show:

FIG. 1 a perspective view of an arrangement according to the invention with four reservoirs, FIG. 2 a perspective view of parts of an arrangement according to the invention, FIG. 3 a unit consisting of a device for emptying receptacles and a device for filling receptacles, FIG. 4 a top view of an arrangement as in FIG. 1, FIGS. 5a+b) perspective views of a trolley docked at a tray bay element, obliquely from behind and obliquely from the front, with the tray bay element open, FIGS. 6a+b) perspective views of a trolley uncoupled from the tray bay element, obliquely from behind and obliquely from the front, with the tray bay element closed, FIG. 7 a perspective view of a trolley with three levels each with seven receptacle compartments, FIG. 8 a perspective view of a container trolley with three containers, FIGS. 9a+b+c a front view, a side view and a top view of a reservoir, FIGS. 10a+b+c the views of the reservoir element in FIGS. 9a to c) with a driverless transport vehicle beneath the reservoir, FIG. 11 an enlarged view of a gripping element, FIGS. 12a+b) a top view and a side view of the gripping element on a receptacle in a container, FIGS. 13a+b) a top view and a side view of the gripping element according to FIG. 10 with a receptacle taken out of the container, FIG. 14 a perspective view of the gripping element obliquely from the front, FIG. 15 a side view of the gripping element according to FIG. 12, FIG. 16 details of a gripping element, FIG. 17 a perspective view of the gripping element during transport of a receptacle, FIG. 18 a further embodiment of a gripping element, FIG. 19 a further embodiment of a gripping element, FIG. 20 a top view of the gripping element according to FIG. 15 in a partial section, FIG. 21 a side view of the gripping element according to FIG. 15, FIG. 22 a side view of the gripping element according to FIG. 19 with the receptacle just released, and FIGS. 23a+b) a top view and side view of a further embodiment of a gripping element with movable supporting element.

The arrangements shown serve to empty, fill and store receptacles filled or to be filled with articles. The handling device as a universal gripping system forms part of the arrangement and serves to transfer the receptacles between the individual components of the arrangement.

In FIG. 1 such an arrangement 10 is shown which is essentially composed of a central handling device 11, a device 12 for emptying receptacles 13, a device 14 for filling receptacles 13 and four reservoirs 15, 16, 17, 18, the devices 12 and 13 and the reservoirs 15 to 18 being connected to each other by fence elements 19 to form a work chamber 20. The handling device 11 is arranged inside the work chamber 20 and so shielded from the outside. The work chamber 20 forms more or less a self-contained cell within which the handling device 11 is displaceable, pivotable or otherwise movable with several degrees of freedom. Alternatively, the number of devices 12 and 14 which alter the fill level of the receptacles 13 for emptying and filling the receptacles 13 as well as the number of reservoirs 15 to 18 can be varied.

Figure 5B:
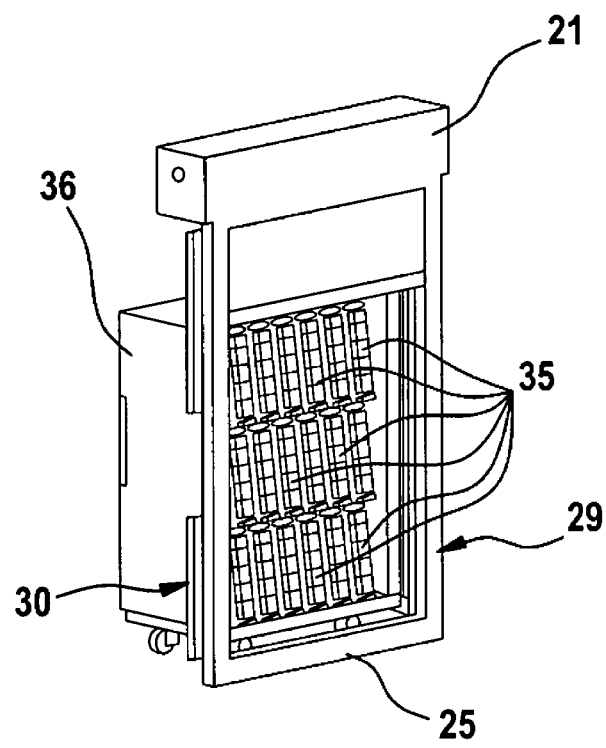

The reservoirs 15 to 18 are designed to be closable on their side facing inwardly towards the handling device 11 or the work chamber 17. For this purpose, associated with each reservoir 15 to 18 is a tray bay element which can be designed e.g. as a roll-up gate 21, 22, 23, 24. The roll-up gates 21 to 24 can be opened and closed again to disconnect each reservoir 15 to 18 from the work chamber 17. In FIG. 1 the roll-up gate 21 is open, while the roll-up gates 22 to 24 are closed. The reservoirs 15 to 18 can be coupled to the tray bay elements or roll-up gates 21 to 24 and uncoupled again in order to be able to exchange the reservoirs 15 to 18, if necessary. The reservoirs 15 to 18 can be fixed to a frame 25, 26, 27, 28 of the roll-up gates 21 to 24 in order to be able to ensure secure positioning, particularly during operation of the arrangement 10. Fixing is carried out by means of plate elements 29, 30 arranged laterally on the frame 25 to 28 (see e.g. FIGS. 5a and 5b). The plate elements 29, 30 are pivotable and allow fixing both tangentially and perpendicularly to the opening of the roll-up gate 21 to 24 when the plate elements 29, 30 are pivoted outwards.

The devices 12 and 14 are arranged adjacent to each other. In front of the device 12 for emptying the receptacles 13 are an upper belt station 31 and a lower belt station 32. The belt station 31 serves to deposit full receptacles 13 and feed them to the device 12. The belt station 32 serves to deposit the receptacles 13 emptied in the device 12 and carry them away from the device 12. The device 14 for filling the receptacles 13 is analogously equipped with an upper belt station 33 and a lower belt station 34, wherein the belt station 33 serves to deposit empty receptacles 13 and feed them to the device 14, and the belt station 34 serves to deposit the receptacles 13 filled in the device 14 and carry them away from the device 14. The belt stations 31 to 34 are all oriented the same, this being such that the receptacles 13 can be conveyed transversely to their longitudinal extent, that is, with one broad side in front.

Associated with each device 12 and 14 in the embodiment shown are two reservoirs 15, 16 and 17, 18. The reservoirs 15 and 18 are offset from the device 12 or 14 by 90°. This means that the orientation of the receptacles 13 in the reservoirs 15 and 18 and on the belt stations 31 to 34 is the same. The reservoirs 16 and 17 are offset from the reservoirs 15 and 18 by 90° and stand on the opposite side of the handling device 11 to the devices 12, 14. The devices 12 and 14 can each be designed as a so-called "top loader" with an access for the receptacles 13 from above or as a "front loader" with an access for the receptacles 13 from the front or from the side.

The reservoirs 15 to 18 are optionally stationary or mobile. Possible stationary reservoirs are e.g. fixed frames which have compartments 35 for receiving the receptacles 13. In another embodiment, not shown, stationary containers are arranged in a shelved store, which can also be provided e.g. with a belt station for providing the receptacles to the gripping region of the handing device 11. In FIGS. 5 to 10 are shown different mobile reservoirs 15 to 18. FIG. 5a shows a trolley 36 which is also called a tray trolley. The trolley 36 is coupled to a roll-up gate 21 in the region of the frame 25 and fixed by the plate elements 29, 30. The roll-up gate 21 is open (see FIG. 5b). The closed position of the roll-up gate 21 is shown in FIG. 6b. In FIG. 6 the trolley 36 is uncoupled from the roll-up gate 21. The roll-up gate 21 can be in different states, namely, firstly in a fully closed position as in FIG. 6b. In this position the trolley 36 can be taken away or a new trolley 36 can be docked. Secondly, the roll-up gate 21 can rest with its lower edge more or less flush on the trolley 36 (see FIG. 5b), so that the trolley 36 can be worked off. In a further position (not shown), the lower edge of the roll-up gate 21 is moved upwards to the maximum. This position is provided for interrupting operation of the arrangement 10 in order to be able to enter the cell or work chamber 20.

The trolley 36 (e.g. according to FIG. 7) has three levels 37, 38, 39 on each of which are arranged seven compartments 35. The compartments 35 are provided with a slightly inclined bottom element 40 to prevent the articles from falling out of the partly open receptacles 13. Furthermore, the compartments 35 are designed in such a way that the receptacles 13 arranged in the compartments 35 are accessible to the handling device 11 on the bottom side, that is, on the side facing towards the bottom elements 40.

FIG. 8 shows a container trolley 41 which has three containers 42 in the embodiment shown. The containers 42 can be arranged loosely or fixed on the container trolley 41. The compartments 35 of the containers 42 are designed in such a way that the receptacles 13 arranged in the compartments 35 are not accessible to the handling device 11 on the bottom side, so that support of the receptacles 13 is possible only after partially pulling them out.

Further embodiments of the reservoirs 15 to 18 are shown in FIGS. 9 and 10. The reservoirs shown therein are constructed as receptacle frames 43 similar to the trolleys 36, with the difference that, instead of the castors, stilt-like legs 44 are provided. The legs 44 are so high that e.g. a driverless or guideless transport system 45 can be moved under the receptacle frame 43 in order to exchange the latter. It can further be seen from FIGS. 9a and 10a that associated with each of the compartments 35 are guide rails 46 corresponding to the inclined bottom elements 40.

The handling device 11 is of universal construction such that receptacles 13 can be gripped at a smooth partial surface on the side facing out of the open reservoir 15 to 18. Usually each receptacle 13 has, on a face which faces out of the reservoir 15 to 18, at least one small contact surface which can be engaged by gripping elements. Below, the handling device 11 is described in more detail as a component of the arrangement 10.

The handling device 11 essentially comprises a handling arm 47 and a gripping element 48. The handling arm 47 is constructed in the usual manner and movable in several degrees of freedom, this being both in a linear direction and pivotably. The gripping element 48 is arranged movably at a free end 49 of the handling arm 47. The gripping element 48 itself essentially consists of a frame-like linear guide 50, a movable carrying element 51 and a holding element 52 for the receptacles 13. Furthermore, the gripping element 48 has a drive 53 for the linear and pivot movements of the gripping element 48.

The linear guide 50 is roughly U-shaped. For this, a track rail 54 has at opposite ends two frame elements 55 and 56 which, starting from the track rail 54, extend downwards. The carrying element 51 is movable on the track rail 54 for gripping, pulling the receptacles 13 out of a reservoir 15 to 18 and pushing them into a reservoir 15 to 18. The gripping element 48 is constructed in such a way that receptacles 13 can be gripped on smooth partial surfaces on the side facing out of the reservoir 15 to 18. For this purpose, on the gripping element 48 are arranged elements for pushing and/or pulling the receptacles 13. The elements for pulling the receptacles 13 are designed as suction cups 57. Preferably, two suction cups 57 are arranged spaced apart and one above the other on the carrying element 51, this being on the side facing towards the receptacles 13. A buffer element 58 for pushing the receptacles 13 is associated with each suction cup 57, so that two buffer elements 58 are arranged spaced apart and one above the other on the carrying element 51 (see e.g. FIG. 15). The suction cups 57 are connected to suction air pipes, not shown. The buffer elements 58 are made of elastic material in an almost rigid construction.

Figure 13B:
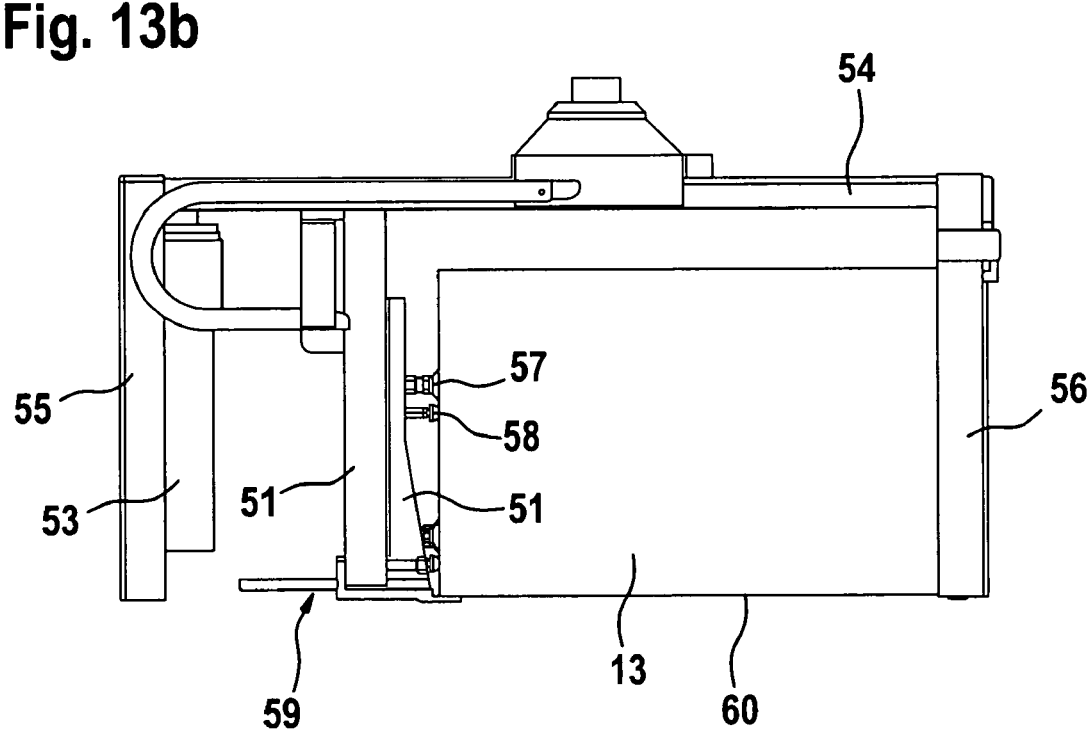

On the carrying element 51 is arranged a supporting element 59 supporting the bottom of a receptacle 13. In FIG. 15 the supporting element 59 is e.g. stationary and extends from the carrying element 51 in the same direction as the suction cups 57 and buffer elements 58. However, the supporting element 59 can also be designed to be movable or capable of yielding (see e.g. FIG. 12b). The movable supporting element 59 is spring-loaded and in a yielding position is retracted against the spring force behind the suction cups 57 and buffer elements 58 (FIG. 12b). In a supporting position (see e.g. FIG. 13b) the supporting element 59 is positioned below the bottom 60 of the receptacle 13.

On the gripping element 48, preferably in the region of the carrying element 51 on the side facing towards the receptacles 13, is arranged at least one sensor element 61. Preferably several, in particular three sensor elements 61 are provided. The sensor elements 61 serve in particular to detect the position of the receptacle bottom plane and the receptacle rear wall plane. Furthermore, on the gripping element 48 is arranged at least one monitoring means, preferably a camera 62. The camera 62 is arranged on the holding element 52, this being in such a way that inspection inside the receptacle 13 is ensured for purposes of monitoring the contents as well as the state of the contents (see e.g. FIG. 16).

It can further be seen from FIG. 16 that the holding element 52 includes a pressure plate 63 which is movable by means of pressure cylinders 64. The pressure plate 63 serves to fix the receptacles 13 during transport thereof. The receptacle 13 is clamped between the pressure plate 63 and a bar 65 during transport, the receptacle 13 being additionally supported on the supporting element 59 on the side opposite the bar 65. The pressure plate 63 is functionally connected to a further plate 66 which can likewise be actuated by the pressure cylinders 64. The plate 66 serves to fix the articles inside the receptacles 13.

In a further embodiment according to FIG. 19 are provided several cameras 67 which serve to detect unwanted movements of the articles inside the receptacles 13 as well as optical quality control. For this purpose the cameras 67 are arranged above the receptacles 13 to be transported, so that inspection can take place from above.

Figure 23B:
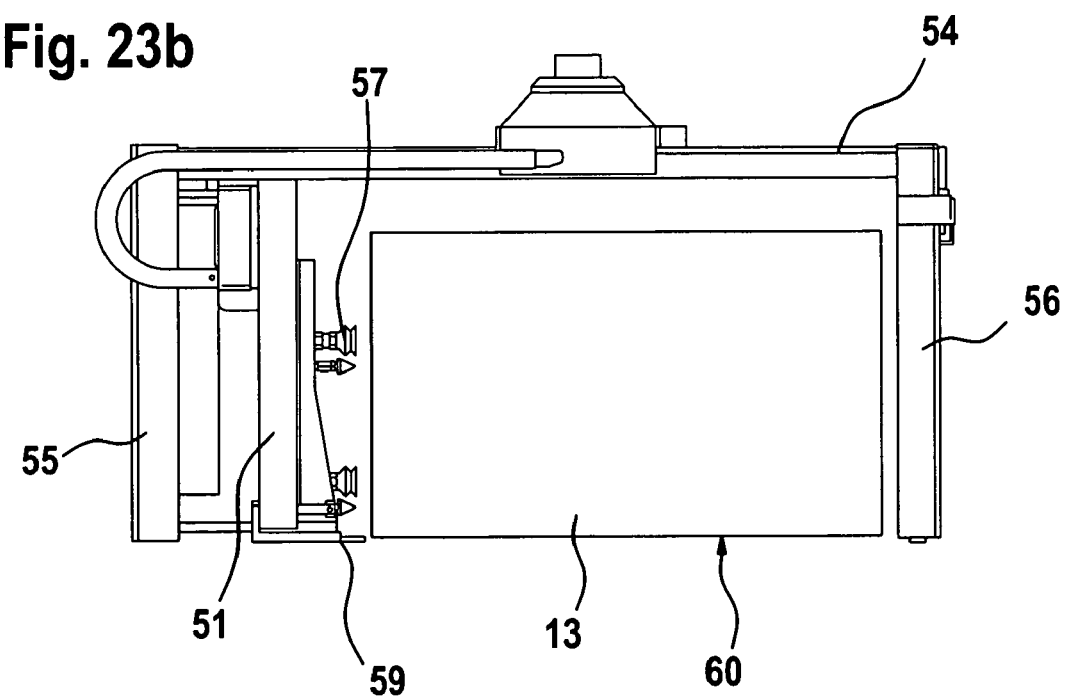

Essential method principles, in particular the operations for removing receptacles 13 from the reservoirs 15 to 18, are described below. When using a container trolley 41 as the reservoir 15 to 18, the gripping element 48 for removing e.g. a full receptacle 13 from a compartment 35 of the container 42 is positioned in front of the compartment 35. The suction cups 57 enter the compartment 35. The supporting element 59 is in this case retracted against the spring force, so that in the immersed state it acts not as a supporting element 59 but as a stop. The gripping element 48 can therefore enter the compartment 35 without colliding with the bottom elements 40 of the compartment 35 (see e.g. FIG. 12b). As soon as the receptacle 13 is at least partially pulled out of the compartment 35, the supporting element 59 is moved by the spring force into the position below the bottom 60 of the receptacle 13 (see e.g. FIG. 13b). The receptacle 13 fully removed from the compartment 35 is then moved by the handling arm 47 e.g. into the region of the device 12 for emptying the receptacle 13. As soon as the receptacle 13 which is still in the gripping element 48 is located above the belt station 31, the gripping element 48 opens by the fact that the fixing of the receptacle 13 and support inter alia by the supporting element 59 are released. FIG. 23 shows the gripping element 48 in the open state directly after transfer to the belt station 31 or just before receiving e.g. an emptied receptacle 13 from the lower belt station 32. Closing of the gripping element 48 takes place in the reverse order to opening.

Removal of a receptacle 13 e.g. from a trolley 36 with a gripping element 48 with a fixed, non-movable supporting element 59 proceeds as follows. FIG. 14 shows the searching movement of the gripping element 48 in front of a compartment 35 with a receptacle 13. By means of the sensor elements 61 the positions of the receptacle bottom plane and the receptacle rear wall plane are determined (see also FIG. 15). As soon as the gripping element 48 is correctly positioned in front of a compartment 35, the gripping element 48 advances so far in the direction of the receptacle 13 that the supporting element 59 grips inside the compartment 35 under the bottom 60 of the receptacle 13, so that the receptacle 13 rests on the supporting element 59. By retraction of the gripping element 48, the receptacle 13 is pulled out of the compartment. In FIG. 16 the receptacle 13 is already partially pulled out of the compartment 35 and rests only by the distal end on the bottom element 40 of the compartment 35. When the receptacle 13 is pulled out, it is supported on the bar 65 and guided by the frame element 56 (in FIG. 16 the frame element 56 is omitted for clarity's sake). At the same time the position of the articles in the receptacle 13 and complete emptying of the receptacle 13 are checked by the camera 62. The receptacle 13 is positioned by its own bottom 60 during transport. The rear side wall is pressed by a plate between lateral guides (see also the cross-section as in FIG. 20). The front side wall is held by the suction cups 57 and supported from below by the fixed supporting element 59. FIG. 21 shows the gripping element 48 with the fixed supporting element 59 in the transport state. As soon as the gripping element 48 has reached its position for discharge of the receptacle 13 above the belt station 31, the receptacle 13 is deposited and the gripping element 48 opened. For this purpose the pressure plate 63 is released and lifted slightly. The receptacle 13 stands on the belt station 31. The carrying element 51 moves away from the receptacle side wall and the handling device 11 commences the opposite movement, but to a smaller extent than the carrying element 51, so that the gripping element 48 is opened. Now the handling device 11 can pivot and receive another receptacle 13 in the reverse order of operation.

The invention claimed is:

1. An arrangement for filling and/or emptying receptacles filled and/or to be filled with articles, comprising:
    a tray bay element;
    a first reservoir that holds the receptacles, the first reservoir adapted to couple with, and uncouple from, the tray bay element;
    a device that alters the level of the receptacles;
    fence elements interconnecting the tray bay element and the device that alters the level of the receptacles, to enclose a work chamber; and
    a handling device for transporting the receptacles between the first reservoir and the device that alters the level of the receptacles, wherein the handling device is located in the work chamber between the device that alters the level of the receptacles and the first reservoir,
    wherein the first reservoir includes an inwardly directed side that faces towards the handling device and the tray bay element is adapted to open and close in order to provide access to the inwardly directed side of the first reservoir.

2. The arrangement according to claim 1, further comprising:
    second, third and fourth reservoirs that hold the receptacles; and
    second, third, and fourth tray bay elements adapted to couple with, and uncouple from, the second, third, and fourth reservoirs, respectively;
    wherein the device that alters the level of the receptacles comprises a device that empties the receptacles and a device that fills the receptacles;
    wherein the fence elements interconnect the tray bay element, the second tray bay element, the third tray bay element, the fourth tray bay element the device that empties the receptacles, and the device that fills the receptacles into an annular cell enclosing the work chamber, the handling device being arranged in the work chamber.

3. The arrangement according to claim 1, wherein the tray bay element comprises a roll-up gate.

4. The arrangement according to claim 3, wherein the roll-up gate includes a frame surrounding the roll-up gate, and the first reservoir is fixable to the frame.

5. The arrangement according to claim 4, wherein the first reservoir comprises a trolley, the arrangement further comprising a plate element pivotably mounted to the frame to fix the trolley proximate to the roll-up gate.

6. The arrangement according to claim 1, wherein the first reservoir is stationary or mobile.

7. The arrangement according to claim 1, wherein the first reservoir has at least one compartment for receiving the receptacles.

8. The arrangement according to claim 1, wherein the first reservoir comprises a trolley.

9. The arrangement according to claim 1, wherein the first reservoir comprises a container trolley.

10. The arrangement according to claim 1, wherein the receptacles include a side facing out of the first reservoir having a smooth partial surface, wherein the handling device is adapted to grip the smooth partial surface.

11. The arrangement according to claim 10, wherein the handling device comprises:
    a movable handling arm having a free end,
    a gripping element which is arranged movably at the free end of the handling arm, and
    at least one linear guide comprising:
        a carrying element movable on the linear guide,
        a holding element for the receptacles, and
        a drive that moves the carrying element,
    wherein the gripping element is adapted to grip the smooth partial surface of the receptacles.

12. The arrangement according to claim 11, wherein the gripping element comprises elements for pushing and/or sliding the receptacles.

13. The arrangement according to claim 11, wherein the gripping element has at least one suction cup for pulling the receptacles.

14. The arrangement according to claim 13, wherein the gripping element has at least one buffer element for pushing the receptacles.

15. The arrangement according to claim 14, wherein each suction cup and/or each buffer element is arranged on the carrying element on a side facing towards the receptacles.

16. The arrangement according to claim 11, further comprising a supporting element that supports the bottom of the receptacles arranged on the carrying element.

17. The arrangement according to claim 16, wherein the supporting element is movable.

18. The arrangement according to claim 11, further comprising a sensor element arranged on the carrying element on a side facing towards the receptacles.

19. The arrangement according to claim 11, further comprising a monitoring element on the gripping element that monitors the contents and state of the receptacles.

20. The arrangement according to claim 11, further comprising at least one additional fixing element for the receptacle and/or for the contents of the receptacles located proximate the holding element for the receptacles.

21. Arrangement for filling and/or emptying receptacles filled and/or to be filled with articles, comprising:
    at least one handling device for transporting receptacles that have been and/or are to be filled between a reservoir and a device which alters the level of the receptacles,
    at least one device which alters the level of the receptacles, and at least one reservoir for holding receptacles that have been and/or are to be filled, wherein the arrangement constitutes a closed unit, such that the handling device is surrounded in cell fashion by the at least one device altering the level of the receptacles and by the at least one reservoir, wherein the at least one handling device comprises:
- a movable handling arm having a free end,
- a gripping element which is arranged movably at the free end of the handling arm, and
- at least one linear guide comprising:
  - a carrying element movable on the linear guide,
  - a movable, spring-loaded supporting element located on the carrying element, the supporting element adapted to support a bottom of the receptacles,
  - a holding element for the receptacles, and
  - a drive for moving the carrying element, wherein the gripping element is adapted to grip smooth partial surfaces on a side of the receptacles facing out of a reservoir.

* * * * *